(12) United States Patent
Chou et al.

(10) Patent No.: US 7,427,217 B2
(45) Date of Patent: *Sep. 23, 2008

(54) EXTENDED UBS PROTOCOL CONNECTOR AND SOCKET

(75) Inventors: Horng-Yee Chou, Palo Alto, CA (US); Ren-Kang Chiou, Fremont, CA (US); Szu-Kuang Chou, Cupertino, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,137

(22) Filed: Aug. 24, 2006

(65) Prior Publication Data

US 2006/0286865 A1  Dec. 21, 2006

Related U.S. Application Data

(63) Continuation of application No. 10/834,457, filed on Apr. 28, 2004, now Pat. No. 7,125,287, which is a continuation-in-part of application No. 10/708,172, filed on Feb. 12, 2004, now Pat. No. 7,021,971, which is a continuation-in-part of application No. 10/605,146, filed on Sep. 11, 2003, now Pat. No. 6,854,984.

(51) Int. Cl.
 *H01R 24/00* (2006.01)
(52) U.S. Cl. ..................................... 439/660
(58) Field of Classification Search ............... 439/660, 439/607; 710/310, 301, 62; 361/685
See application file for complete search history.

(56) References Cited

U.S. PATENT DOCUMENTS

| | | | |
|---|---|---|---|
| 5,330,360 A | 7/1994 | Marsh et al. | |
| 5,339,222 A | 8/1994 | Simmons et al. | |
| 5,386,340 A | 1/1995 | Kurz | |
| 5,420,412 A | 5/1995 | Kowalski | |
| 5,450,396 A | 9/1995 | Havermans | |
| 5,476,387 A | 12/1995 | Ramey et al. | |
| 5,725,395 A | 3/1998 | Lee et al. | |
| 5,941,733 A | 8/1999 | Lai et al. | |
| 6,027,375 A | 2/2000 | Wu et al. | |
| 6,091,605 A | 7/2000 | Ramey et al. | |
| 6,165,016 A | 12/2000 | Lai | |

(Continued)

OTHER PUBLICATIONS

PQI., "Intelligent Stick 2.0", Oct. 14, 2004, pp. 1-3, http://www.pqi.com.1w/eng/ourproductlourproduct.h.

(Continued)

*Primary Examiner*—Alexander Gilman
(74) *Attorney, Agent, or Firm*—IP Strategy Group, P.C.

(57) ABSTRACT

Extended Universal-Serial-Bus (USB) plugs and sockets are disclosed. The extended USB plug includes an extended pin substrate having an extended substrate length longer than a length of a pin substrate of an industry-standard USB connector plug. There is further included a plurality of USB connector contacts configured to carry USB signals and a plurality of non-USB connector contacts configured to carry non-USB signals. The extended Universal-Serial-Bus (USB) plug, which includes an extended pin substrate having an extended substrate length longer than a length of a pin substrate of an industry-standard USB connector plug. There is included a plurality of USB connector contacts configured to carry USB signals and a plurality of non-USB connector contacts configured to carry non-USB signals.

20 Claims, 21 Drawing Sheets

U.S. PATENT DOCUMENTS

| | | | |
|---|---|---|---|
| 6,314,479 B1 | 11/2001 | Frederick et al. | |
| 6,334,793 B1 | 1/2002 | Amoni et al. | |
| 6,354,883 B2 | 3/2002 | Jaing | |
| 6,385,677 B1 | 5/2002 | Yao | |
| 6,439,464 B1 | 8/2002 | Fruhauf et al. | |
| 6,453,371 B1 | 9/2002 | Hampson et al. | |
| 6,533,612 B1 | 3/2003 | Lee et al. | |
| 6,561,421 B1 | 5/2003 | Yu | |
| 6,567,273 B1 | 5/2003 | Lie et al. | |
| 6,578,768 B1 | 6/2003 | Binder et al. | |
| 6,581,122 B1 | 6/2003 | Sarat | |
| 6,599,152 B1 | 7/2003 | Oliphant et al. | |
| 6,602,088 B1 | 8/2003 | Zhu | |
| 6,628,498 B2 | 9/2003 | Whitney et al. | |
| 6,658,516 B2 | 12/2003 | Yao | |
| 6,692,268 B2 | 2/2004 | Kung et al. | |
| 6,692,312 B1 | 2/2004 | Semmeling et al. | |
| 6,705,902 B1 | 3/2004 | Yi et al. | |
| 6,712,646 B2 | 3/2004 | Shindo | |
| 6,719,570 B2 | 4/2004 | Tsuchioka | |
| 6,745,267 B2 | 6/2004 | Chen et al. | |
| 6,752,321 B1 | 6/2004 | Leaming | |
| 6,758,685 B1 | 7/2004 | Huang et al. | |
| 6,763,408 B1 | 7/2004 | Sonoda | |
| 6,778,401 B1 | 8/2004 | Yu et al. | |
| 6,801,971 B1 | 10/2004 | Devine et al. | |
| 6,813,662 B2 | 11/2004 | Park | |
| 6,854,984 B1 | 2/2005 | Lee et al. | |
| 6,857,897 B2 | 2/2005 | Conn | |
| 6,860,609 B2 | 3/2005 | Olson et al. | |
| 6,871,244 B1 | 3/2005 | Cahill et al. | |
| 6,874,044 B1 | 3/2005 | Chou et al. | |
| 6,890,207 B2 | 5/2005 | Kobayashi | |
| 6,908,038 B1 | 6/2005 | Le | |
| 6,908,330 B2 | 6/2005 | Garrett et al. | |
| 7,104,807 B1 | 9/2006 | Wang et al. | |
| 7,104,848 B1 | 9/2006 | Chou et al. | |
| 7,108,560 B1 | 9/2006 | Chou et al. | |
| 7,125,287 B1 | 10/2006 | Chou et al. | |
| 7,182,646 B1 * | 2/2007 | Chou et al. | 439/660 |
| 7,186,147 B1 | 3/2007 | Chou et al. | |
| 2003/0094490 A1 | 5/2003 | Lee | |
| 2003/0100203 A1 | 5/2003 | Yen | |
| 2003/0104835 A1 | 6/2003 | Douhet | |
| 2003/0145141 A1 | 7/2003 | Chen et al. | |
| 2004/0087213 A1 | 5/2004 | Kao | |
| 2005/0048846 A1 | 3/2005 | Suzuki et al. | |
| 2005/0059301 A1 | 3/2005 | Chou et al. | |

OTHER PUBLICATIONS

"PCI Express Architecture Initiative Overview," Oct. 2003, pp. 1-30, www.express-lane.org.

Foxconn, "PMCIA Connector," Specifications Sheet, pp. 1.

"Engineering Change Notice: Rounded Chamfer," pp. 1-3.

"Product Specification: PCMCIA Memory Card Connector," Specification No. PS98007 Rev. 2, Dec. 2, 2001, pp. 1.

Larky et al., "You've Come a Long Way, USB (history and future of USB port technology)," Jul. 23, 2001, Electronic News, pp. 1-2.

Brewer et al., "PCI Express Technology," Feb. 2004, White Paper, Dell, pp. 1-11.

"USB Engineering Change Notice: Pull-up/pull down resistors," pp. 1-5.

"Errata for 'USB Revision 2.0 Apr. 27, 2000' as of May 28, 2002", pp. 1-7. www.usb.org.

Tyco Electronics., "Design Objectives: ExpressCard Connector," 108-5923, Aug. 27, 2003, pp. 1-10.

"USB 2.0 Specification Engineering Change Notice (ECN) #1: Mini-B Connector," Oct. 20, 2000, 44 pages.

"Errata for 'USB Revision 2.0 Apr. 27, 2000' as of Dec. 7, 2000," pp. 1-31.

PCMCIA, "ExpressCard(T M) Technology: The New Standard for High-Performance, Low-Cost I/O Expansion for Desktop and Mobile Systems," 1 page. www.expresscard.org.

PCMCIA, "The ExpressCard(T M) Standard—The Next Generation PC Card Technology," Oct. 2003, pp. 1-4.

"USB Engineering Change Notice: Interface Association Descriptors," pp. 1-5.

"On-The-Go Supplement to the USB 2.0 Specification: Revision 1.0a," Jun. 24, 2003, pp. 1-77.

Bhatt et al., "Creating a Third Generation I/O Interconnect," pp. 1-11, www.express-lane.org.

FoxConn, "PMCIA Socket Connector," Specifications, 1 page.

"Electronic Interconnect Devices (Connectors)," 9 pages.

Farnell, "Reference Material: A guide to connector terminology," pp. 1-12 pages.

"Diagram for Tyco," 3 pages.

"Connector Supports Removable ExpressCardTM modules," Jun. 27, 2005, 1 page. www.news.thomasnet.com/fullstory/464708.

ExpressCard, "ExpressCard Questions and Answers," Mar. 17, 2006, pp. 1-6 http://www.expresscard.org/web/site/qa.jsp.

PCMCIA, "About PCMCIA," Mar. 17, 2006, pp. 1-5, http://www.pcmcia.org/about.htm.

"ExpressCard: Changing The Face Of Computing," Nov. 24, 2003, pp. 1-3. http://www.elecdesign.com/Articles/Index.cfm?AD=1&ArticleID=6608.

Foxconn, "PCMCIA Connector," 1 page.

U.S. Appl. No. 11/467,134, filed Aug. 24, 2006: Inventors: Chou et at.

U.S. Appl. No. 10/1888,105, filed Jul. 9, 2004; Inventors: Wang et at.

U.S. Appl. No. 10/854,004, filed Mar. 25, 2004; Inventors: Chou et al.

U.S. Appl. No. 11/076,514, filed Mar. 8, 2005; Inventors: Yu et al.

"Notice of Office Action," mailed Nov. 14, 2006 for U.S. Appl. 11/467,134, Filed Aug. 24, 2006; Inventors: Chou et al.

"Notice of Office Action," mailed Mar. 16, 2007 for U.S. Appl. No. 11/076,514, Filed Mar. 8, 2005; Inventors: Yu et al.

* cited by examiner

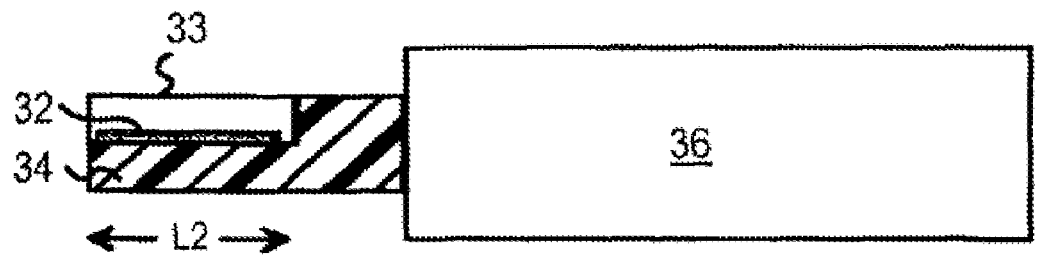
FIG. 3A  PRIOR ART
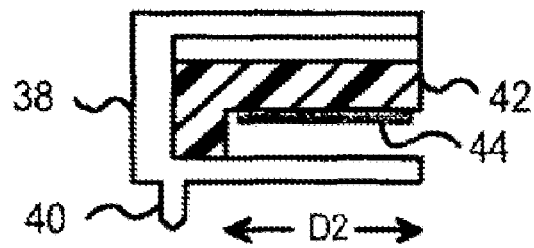
FIG. 3B  PRIOR ART
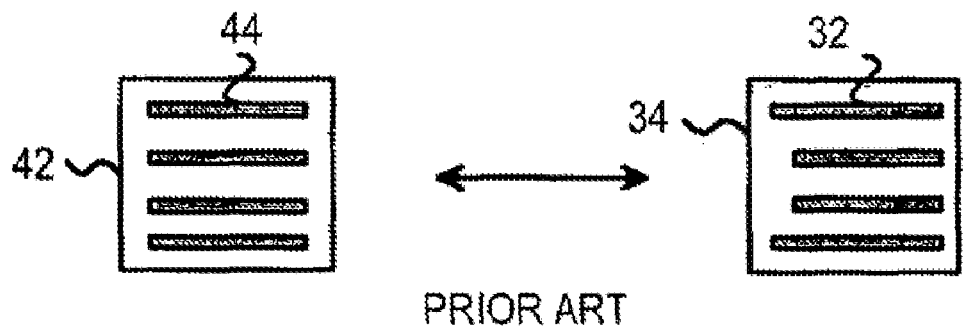
PRIOR ART
FIG. 3C                        FIG. 3D

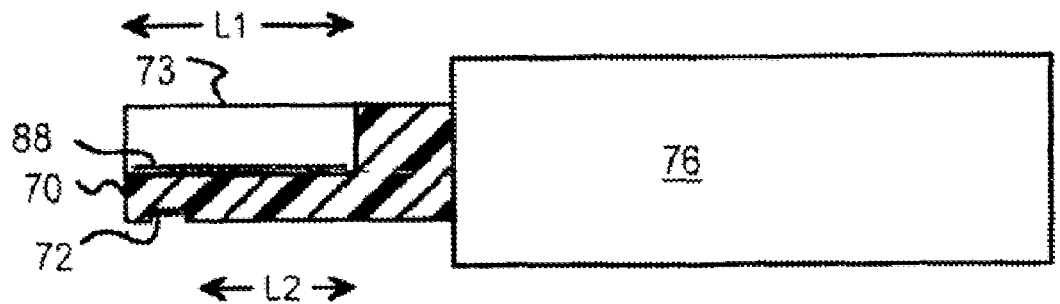
FIG. 4A
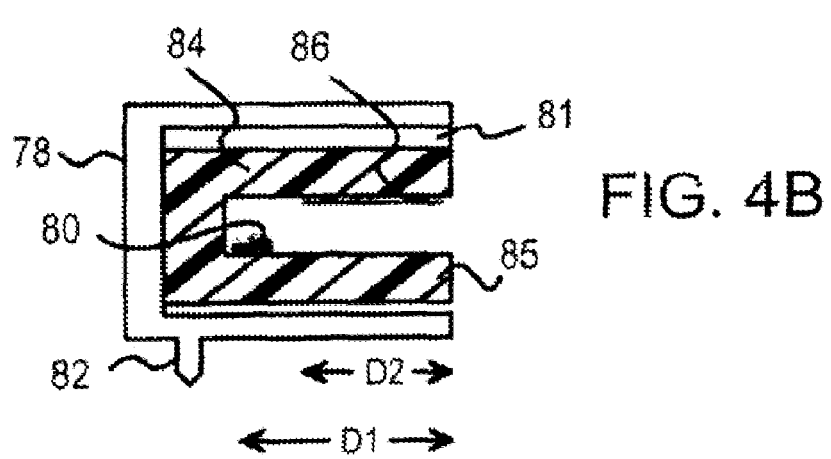
FIG. 4B
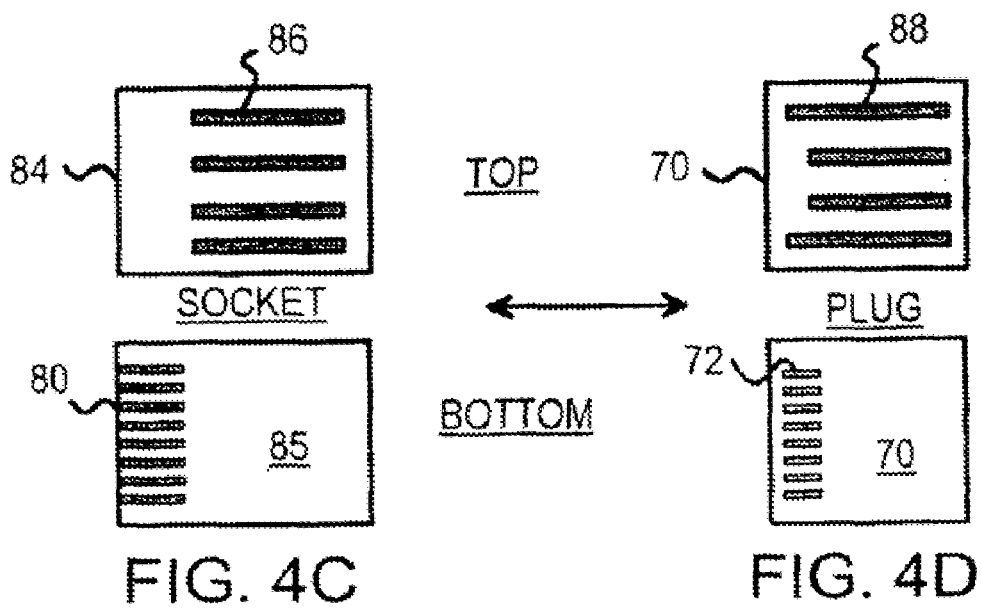
FIG. 4C
FIG. 4D

| SIDE | PIN-OUT | USB | PCI EX | SATA | 1394 |
|---|---|---|---|---|---|
| A | 1 | 5V | 5V | 5V | 5V |
| A | 2 | D- | D- | D- | D- |
| A | 3 | D+ | D+ | D+ | D+ |
| A | 4 | GND | GND | GND | GND |
| B | 1 | 3.3V | 3.3V | 3.3V | 3.3V |
| B | 2 | 1.5V | 1.5V | 1.5V | 1.5V |
| B | 3 | Default | PETn | T- | TPB* |
| B | 4 | Default | PETp | T+ | TPB |
| B | 5 | GND | GND | GND | GND |
| B | 6 | Default | PERn | R- | TPA* |
| B | 7 | Default | PERp | R+ | TPA |
| B | 8 | 12V | 12V | 12V | 12V |

FIG. 6

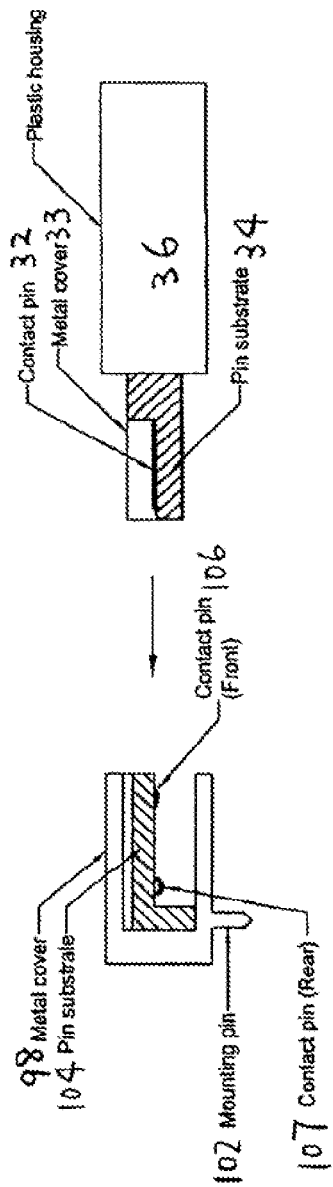
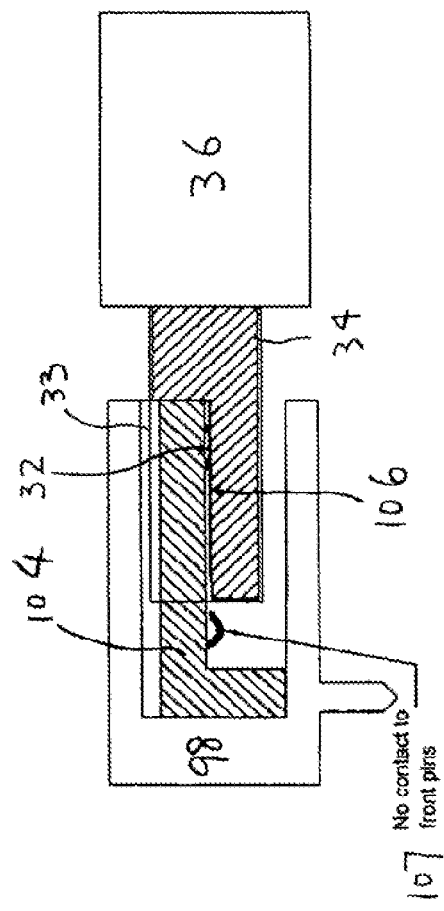
FIG.7G
FIG.7H

Single Mode (including 1 side Multi-mode) Host Detecting Device

Single Mode Device Power-on Sequence

| SIDE | PIN-OUT | USB | PCI EX | SATA | 1394 |
|---|---|---|---|---|---|
| A | 1 | 5V | 5V | 5V | 5V |
| A | 2 | D- | PETn | T- | TPB* |
| A | 3 | D+ | PETp | T+ | TPB |
| A | 4 | GND | GND | GND | GND |
| B | 1 | 3.3V | 3.3V | 3.3V | 3.3V |
| B | 2 | 1.5V | 1.5V | 1.5V | 1.5V |
| B | 3 | GND | GND | GND | GND |
| B | 4 | Default | PERn | R- | TPA* |
| B | 5 | Default | PERp | R+ | TPA |
| B | 6 | 12V | 12V | 12V | 12V |

FIG. 12

EXTENDED UBS PROTOCOL CONNECTOR AND SOCKET

This application is a continuation of and claims priority under 35 USC 120 to a patent application entitled "Extended USB Protocol Plug and Receptacle," U.S. Ser. No. 10/834,457, filed Apr. 28, 2004 now U.S. Pat. No. 7,125,287, which is a continuation-in-part of a patent application entitled "Dual-Personality Extended-USB Plug and Receptacle with PCI-Express or Serial AT-Attachment Extensions," U.S. Ser. No. 10/708,172, Filed Feb. 12, 2004, now U.S. Pat. No. 7,021,971, which is a continuation-in-part of a patent application entitled "Slim USB Connector with Spring-Engaging Depressions, Stabilizing Dividers and Wider End Rails for Flash-Memory Drive", U.S. Ser. No. 10/605,146, Filed Sep. 11, 2003 now U.S. Pat. No. 6,854,984, all of which are incorporated herein by reference.

BACKGROUND OF THE INVENTION

Universal-Serial-Bus (USB) has been widely deployed as a standard bus for connecting peripherals such as digital cameras and music players to personal computers (PCs) and other devices. Currently, the top transfer rate of USB is 480 Mb/s, which is quite sufficient for most applications. Faster serial-bus interfaces are being introduced to address different requirements. PCI Express, at 2.5 Gb/s, and SATA, at 1.5 Gb/s and 3.0 Gb/s, are two examples of high-speed serial bus interfaces for the next generation devices, as are IEEE 1394 and Serial Attached Small-Computer System Interface (SA SCSI or SAS).

FIG. 1A shows a prior-art peripheral-side USB connector. USB connector 10 may be mounted on a board in the peripheral. USB connector 10 can be mounted in an opening in a plastic case (not shown) for the peripheral.

USB connector 10 contains a small connector substrate 14, which is often white ceramic, black rigid plastic, or another sturdy substrate. Generally speaking, connector substrate 14 has four metal contacts 16 formed thereon. In some extended USB implementations, such as that disclosed in U.S. Pat. No. 6,334,793 B1, additional metal contacts (e.g., four additional contacts for a total of eight contacts) may be provided. Metal contacts 16 carry the USB signals generated or received by a controller chip in the peripheral. USB signals include power, ground, and serial differential data D+, D−.

USB connector 10 contains a metal case that wraps around connector substrate 14. The metal case touches connector substrate 14 on three of the sides of connector substrate 14. The top side of connector substrate 14, holding metal contacts 16, has a large gap to the top of the metal case. On the top and bottom of this metal wrap are formed holes 12. USB connector 10 is a male connector, such as a type-A USB connector.

FIG. 1B shows a female USB connector. Female USB connector 20 can be an integral part of a host or PC, or can be connected by a cable. Another connector substrate 22 contains four metal contacts 24 that make electrical contact with the four metal contacts 16 of the male USB connector 10 of FIG. 1A. Connector substrate 22 is wrapped by a metal case, but small gaps are between the metal case and connector substrate 22 on the lower three sides.

Locking is provided by metal springs 18 in the top and bottom of the metal case. When male USB connector 10 of FIG. 1A is flipped over and inserted into Female USB connector 20 of FIG. 1B, metal springs 18 lock into holes 12 of male USB connector 10. This allows the metal casings to be connected together and grounded.

Universal-Serial-Bus (USB) is a widely used serial-interface standard for connecting external devices to a host such as a personal computer (PC). Another new standard is PCI Express, which is an extension of Peripheral Component Interconnect (PCI) bus widely used inside a PC for connecting plug-in expansion cards. An intent of PCI Express is to preserve and re-use PCI software. Unfortunately, USB connectors with their 4 metal contacts do not support the more complex PCI Express standard.

FIGS. 2A-B show an ExpressCard and its connector. A new removable-card form-factor known as ExpressCard has been developed by the Personal-Computer Memory Card International Association (PCMCIA), PCI, and USB standards groups. ExpressCard 26 is about 75 mm long, 34 mm wide, and 5 mm thick and has ExpressCard connector 28.

FIG. 2B shows that ExpressCard connector 28 fits into connector or socket 30 on a host when ExpressCard 26 is inserted into an ExpressCard slot on the host. Since Express-Card connector 28 and socket 30 are 26-pin connectors, they contain many more signals than a 4-pin USB connector. The additional PCI-Express interface can be supported as well as USB. ExpressCard 26 can also use USB to communicate with the host. Differential USB data signals D+ and D− are connected between ExpressCard 26 and a host chip set. The host chip set contains a USB host controller to facilitate communication with ExpressCard 26.

PCI Express supports data rates up to 2.5 G/b, much higher than USB. While the ExpressCard standard is useful for its higher possible data rate, the 26-pin connectors and wider card-like form factor limit the use of ExpressCards. The smaller USB connector and socket are more desirable than the larger ExpressCard.

Another interface, serial AT-attachment (SATA) supports data rates of 1.5 Gb/s and 3.0 Gb/s. However, SATA uses two connectors, one 7-pin connector for signals and another 15-pin connector for power. Due to its clumsiness, SATA is more useful for internal storage expansion than for external peripherals.

While SATA and ExpressCard are much higher-speed interfaces than USB, they use larger, bulky connectors while USB has a single, small connector.

FIGS. 3A-D shows cross-sections of a prior-art USB connector and socket. In FIG. 3A, a prior-art peripheral-side plug or USB connector has plastic housing 36 that the user can grip when inserting the USB connector into a USB socket such as the socket in FIG. 3B. Pin substrate 34 can be made of ceramic, plastic, or other insulating material, and supports metal contact pines 32. There are 4 metal contact pins 32 arranged as shown in the top view of pin substrate 34 in FIG. 3D. Metal cover 33 is an open-ended rectangular tube that wraps around pin substrate 34 and the gap above metal contact pins 32.

In FIG. 3B, a prior-art host-side USB socket is shown, such as a USB socket on a host PC. Metal cover 38 is a rectangular tube that surrounds pin substrate 42 and has an opening to receive the USB connector's pin substrate 34. Metal contact pins 44 are mounted on the underside of pin substrate 42. Mounting pin 40 is formed from metal cover 38 and is useful for mounting the USB socket to a printed-circuit board (PCB) or chassis on the host PC.

Metal contact pins 44 are arranged as shown in the bottom view of pin substrate 42 of FIG. 3C. The four metal contact pins 44 are arranged to slide along and make contact with the four metal contact pins 32 when the USB connector is inserted into the USB socket. Pin substrates 34, 42 are formed in an L-shape with matching cutouts above metal contact pins 32 and below metal contact pins 44 that fit together when inserted.

Metal contact pins 32, 44 can have a slight bend or kink in them (not shown) to improve mechanical and electrical contact. The bend produces a spring-like action that is compressed when the USB connecter is inserted into the USB socket. The force of the compressed spring improves contact between metal contact pins 32, 44.

While useful, prior-art USB sockets and connectors have only four metal contact pins 32 that mate with four contact pins 44. The four metal contact pins carry power, ground, and differential data lines D+, D−. There are no additional pins for extended signals required by other standard buses, such as PCI Express or Serial ATA.

What is desired is an extended USB socket and connector. An extended-USB connector that fits into standard USB sockets, yet has additional metal contacts is desirable. An extended-USB socket that can receive a standard USB connector or the extended USB connector is also desired. The extended socket and connector when mated carry additional signals, allowing for higher-speed bus interfaces to be used. A higher-speed extended connector and socket that are physically and electrically compatible with existing USB sockets and connector is desirable. Auto-detection of higher-speed capabilities is desired when the extended USB connector is plugged into the extended USB socket.

SUMMARY OF INVENTION

The invention relates, in one embodiment, to an extended Universal-Serial-Bus (USB) plug. The extended USB plug includes an extended pin substrate having an extended substrate length longer than a length of a pin substrate of an industry-standard USB connector plug. There is further included a plurality of USB connector contacts arranged in a first row in a direction perpendicular to a longitudinal axis of the extended USB plug, the plurality of USB connector contacts being disposed on the pin substrate and configured to carry USB signals. Additionally, there is included a plurality of non-USB connector contacts arranged in a second row parallel to the first row, the plurality of non-USB connector contacts being configured to carry non-USB signals.

In another embodiment, the invention relates to an extended Universal-Serial-Bus (USB) plug, which includes an extended pin substrate having an extended substrate length longer than a length of a pin substrate of an industry-standard USB connector plug. There is included a plurality of USB connector contacts arranged in a first row in a direction perpendicular to a longitudinal axis of the extended USB plug, the plurality of USB connector contacts being disposed on the pin substrate and configured to carry USB signals. There is further included a plurality of non-USB connector contacts arranged in a second row parallel to the first row, the plurality of non-USB connector contacts being configured to carry non-USB signals.

In a further embodiment, the invention relates to an extended Universal-Serial-Bus (USB) socket, which includes an extended cavity having an extended cavity length longer than a length of a cavity of an industry-standard USB connector socket. There is included a plurality of USB socket contacts arranged in a first row in a direction perpendicular to a longitudinal axis of the extended USB socket, the plurality of USB socket contacts being disposed in the cavity and configured to carry USB signals. There is further included a plurality of non-USB socket contacts arranged in a second row parallel to the first row, the plurality of non-USB socket contacts being configured to carry non-USB signals.

In yet another embodiment, the invention relates to an extended Universal-Serial-Bus (USB) socket, which includes an extended cavity having an extended cavity length longer than a length of a cavity of an industry-standard USB connector socket. There is included a plurality of USB socket contacts arranged in a first row in a direction perpendicular to a longitudinal axis of the extended USB socket, the plurality of USB socket contacts being disposed in the cavity and configured to carry USB signals. There is also included a plurality of non-USB socket contacts arranged in a second row parallel to the first row, the plurality of non-USB socket contacts being configured to carry non-USB signals.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A-D shows cross-sections of a prior-art USB connector and socket.

FIGS. 4A-I show, in accordance with embodiments of the present invention, extended USB connectors and sockets having metal contact pins on both top and bottom surfaces of the pin substrates.

FIG. 6 shows, in accordance with an embodiment of the present invention, a table of extended and standard pins in the extended USB connector and socket for FIG. 5.

FIGS. 7A-H show, in accordance with embodiments of the present invention, a second embodiment of extended USB connectors and sockets having metal contact pins on just one of the surfaces of the pin substrates.

FIG. 12 shows, in accordance with an embodiment of the present invention, 10 pin arrangement instead of 12 pins.

DETAILED DESCRIPTION OF VARIOUS EMBODIMENTS

The present invention relates to improvements in serial-bus connectors and sockets. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiment shown and described, but is to be accorded the widest scope consistent with the principles and novel features herein disclosed.

The inventors have realized that USB connectors and sockets are widely deployed. An extended or enhanced USB connector must fit in standard USB sockets, and an enhanced USB socket must accept standard USB connectors for backward compatibility. Since the height and width of USB connectors/sockets must remain the same for insertion compatibility, the length of each can be extended to fit additional metal contacts for additional signals.

The inventors have also realized that additional metal contacts may be placed on the opposite side of the pin substrates, opposite the existing four metal contact pins. These additional pins must not touch the metal housing or metal cover to prevent shorting to ground when the metal cover is grounded.

Figure 1A:
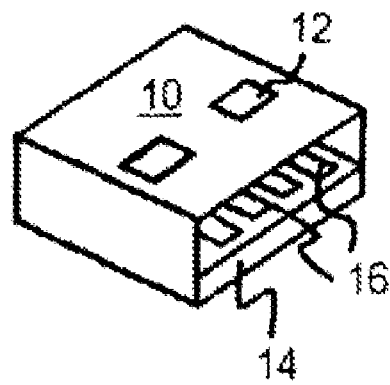
FIG. 1A shows a prior-art peripheral-side USB connector.
Figure 1B:
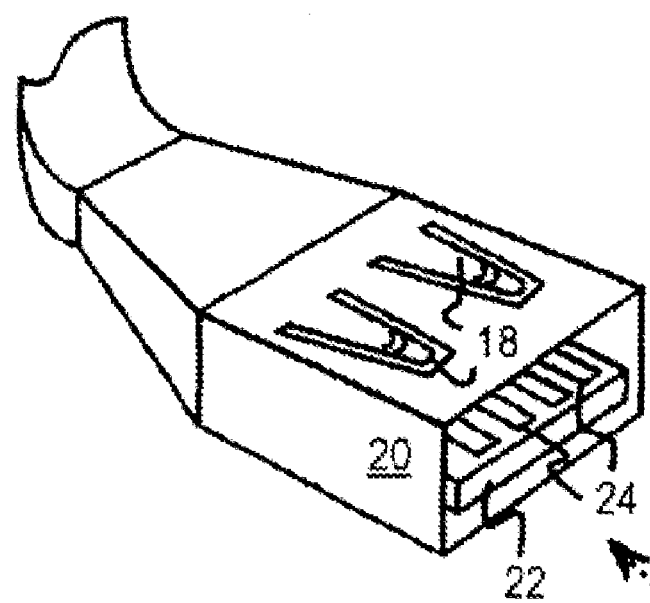
FIG. 1B shows a female USB connector.
Figure 2A:
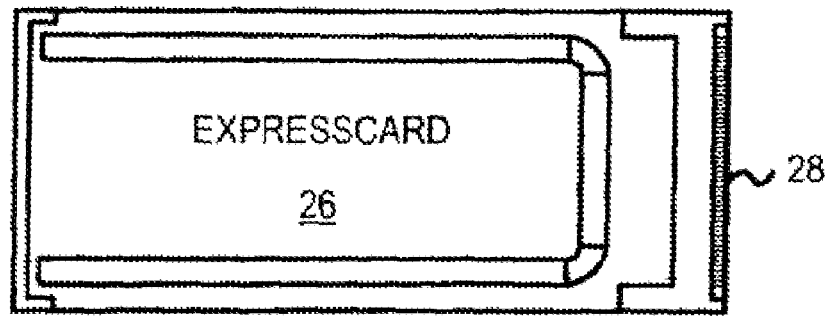
FIGS. 2A-B show an ExpressCard and its connector.
Figure 2B:
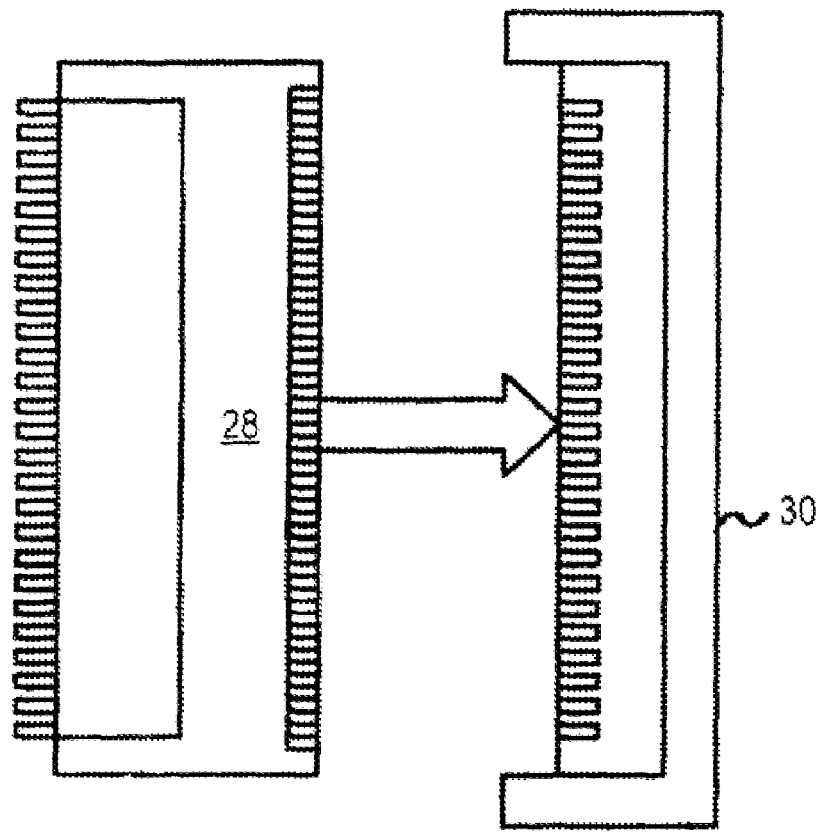
Figure 4E:
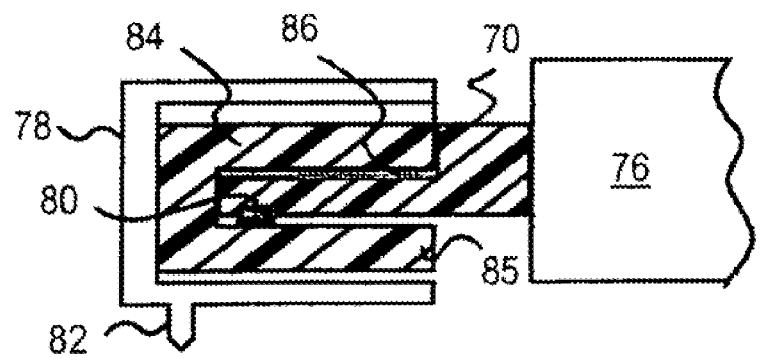

FIGS. 4A-I show a first embodiment of extended USB connectors and sockets having metal contact pins on both top and bottom surfaces of the pin substrates. In FIG. 4A, the extended connector has plastic housing 76 that the user can grip when inserting the connector plug into a socket. Pin substrate 70 supports metal contact pins 88 on the top surface. As shown, pins 88 are disposed in a row that is perpendicular to the longitudinal axis of the extended USB connector plug. Pin substrate 70 is an insulator such as ceramic, plastic, or other material. Metal leads or wires can pass through pin substrate 70 to connect metal contact pins 88 to wires inside plastic housing 76 that connect to the peripheral device.

Reverse-side metal contact pins 72 are placed in a recess in the bottom side of pin substrate 70 near the tip of the connector plug. Ribs can be added alongside contact pins 72 to further prevent shorting. Reverse-side metal contact pins 72 are additional pins for extended signals such as for PCI-Express signals. Metal leads or wires can pass through pin substrate 70 to connect reverse-side metal contact pins 72 to wires inside plastic housing 76 that connect to the peripheral device.

The length L1 of pin substrate 70 is longer than the length L2 of pin substrate 34 in the prior-art USB connector of FIG. 3A. The extension in length (L1-L2) can be 2-5 millimeters, for example. Reverse-side metal contact pins 72 are located mostly in the extension region beyond L2. Metal cover 73 is a rectangular tube that surrounds pin substrate 70 and has an open end. An opening in metal cover 73 on the bottom of pin substrate 70 allows reverse-side metal contact pins 72 to be exposed.

FIG. 4B shows, in accordance with an embodiment of the present invention, an extended-USB socket having metal contact pins on both bottom and top surfaces of the pin substrate. Pin substrate 84 has metal contact pins 86 formed on a bottom surface facing a cavity that pin substrate 70 of the connector fits into. Pin substrate 84 also has lower substrate extension 85 that is not present on the prior-art USB socket, which has an L-shaped pin substrate.

Extension metal contact pins 80 are mounted on lower substrate extension 85 near the rear of the cavity. A bump or spring can be formed on extension metal contact pins 80, such as by bending flat metal pads. This bump allows extension metal contact pins 80 to reach reverse-side metal contact pins 72 which are recessed in pin substrate 70 of the connector.

A cavity is formed by the bottom surface of pin substrate 84 and the top surface of lower substrate extension 85 and the back of pin substrate 84 than connects to lower substrate extension 85. The depth D1 of this cavity is greater than the depth D2 of the prior-art USB socket of FIG. 3B. This extended depth allows for a standard, prior-art USB connector to be inserted into the cavity and not make electrical contact with extension metal contact pins 80, preventing shorting. Metal cover 78 is a metal tube that covers pin substrate 84 and lower substrate extension 85. Metal cover 73 of the USB connector fits in gaps 81 between metal cover 78 and the top and sides of pin substrate 84. Mounting pin 82 can be formed on metal cover 78 for mounting the extended USB socket to a PCB or chassis.

FIG. 4C shows, in accordance with an embodiment of the present invention, the bottom surface of pin substrate 84, which supports metal contact pins 86. These four pins carry the prior-art USB differential signals, power, and ground, and make contact with metal contact pins 88 of the extended USB connector on the top surface of pin substrate 70, shown in the embodiment of FIG. 4D. The length shown for pins 88 are illustrative only; as long as pins 88 can electrically contact with corresponding pins 86 in the extended USB receptacle (and with standard USB socket pins when the extended USB connector is inserted into a standard USB socket), these pins 88 can have any length.

The extended USB connector has 8 reverse-side metal contact pins 72 on the bottom surface of pin substrate 70, arranged as shown in the embodiment of FIG. 4D. These make contact with extension metal contact pins 80, arranged as shown in the embodiments of FIG. 4C on lower substrate extension 85. These 8 extension pins carry extended signals, such as for PCI-Express.

FIG. 4E shows, in accordance with an embodiment of the present invention, the extended USB connector fully inserted into the extended USB socket. When fully inserted, the tip of pin substrate 70 fits into the cavity between pin substrate 84 and lower substrate extension 85 of the extended USB socket. On the upper surface of connector pin substrate 70, metal contact pins 88 make contact with the four metal contact pins 86 of socket pin substrate 84, while reverse-side metal contact pins 72 on the bottom surface of pin substrate 70 make contact with extension metal contact pins 80 on the top surface of lower substrate extension 85.

Since reverse-side metal contact pins 72 are recessed, they do not make contact with metal cover 38 of the prior-art USB socket. Ribs can be added near and/or in between some or all of contact pins 72 to further prevent shorting. Both of these implementations are considered to be recessed implementations since the top of the ribs can be considered to be the top surface of the substrate. This prevents shorting of signals connected to reverse-side metal contact pins 72 to a ground connected to metal cover 38.

Figure 4F:
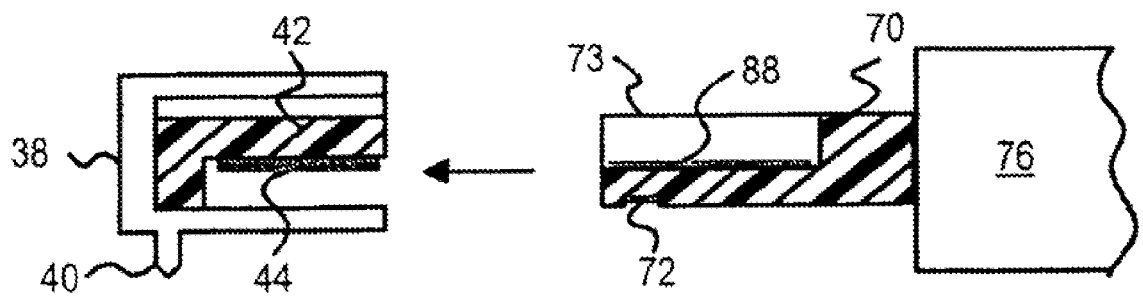
Figure 4G:
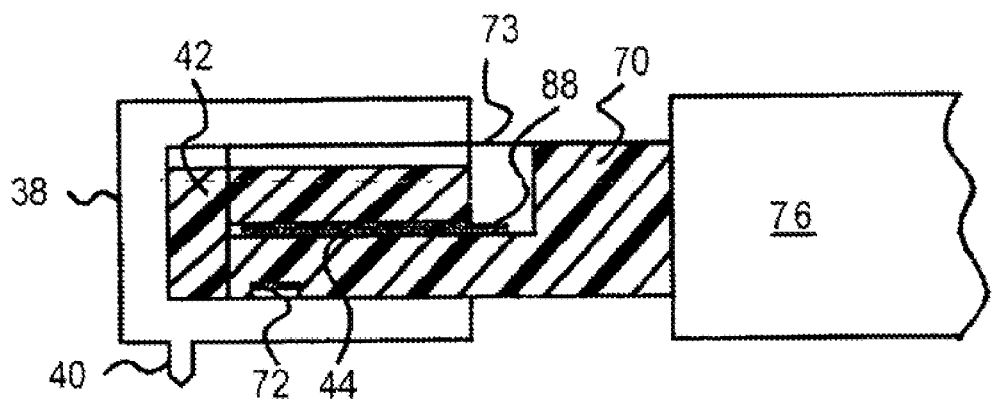

FIG. 4F shows, in accordance with an embodiment of the present invention, the extended USB connector just before insertion into a standard USB socket. When fully inserted, as shown in the embodiment of FIG. 4G, the tip of pin substrate 70 fits under socket pin substrate 42. On the upper surface of connector pin substrate 70, metal contact pins 88 make contact with the four metal contact pins 44 of socket pin substrate 42. Reverse-side metal contact pins 72 on the bottom surface of pin substrate 70 do not make contact with socket metal cover 38 since reverse-side metal contact pins 72 are recessed into the bottom surface of connector pin substrate 70 or when insulating ribs are provided. Thus only the four standard USB pins (metal contact pins 44, 88) are electrically contacted.

Figure 4H:
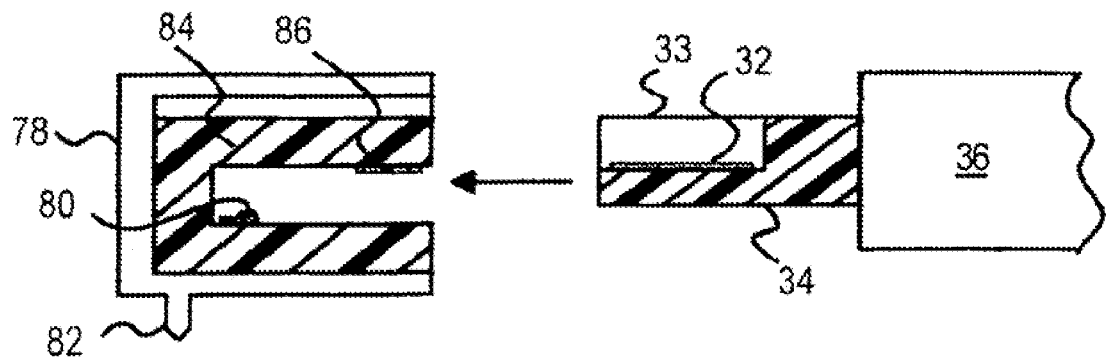
Figure 4I:
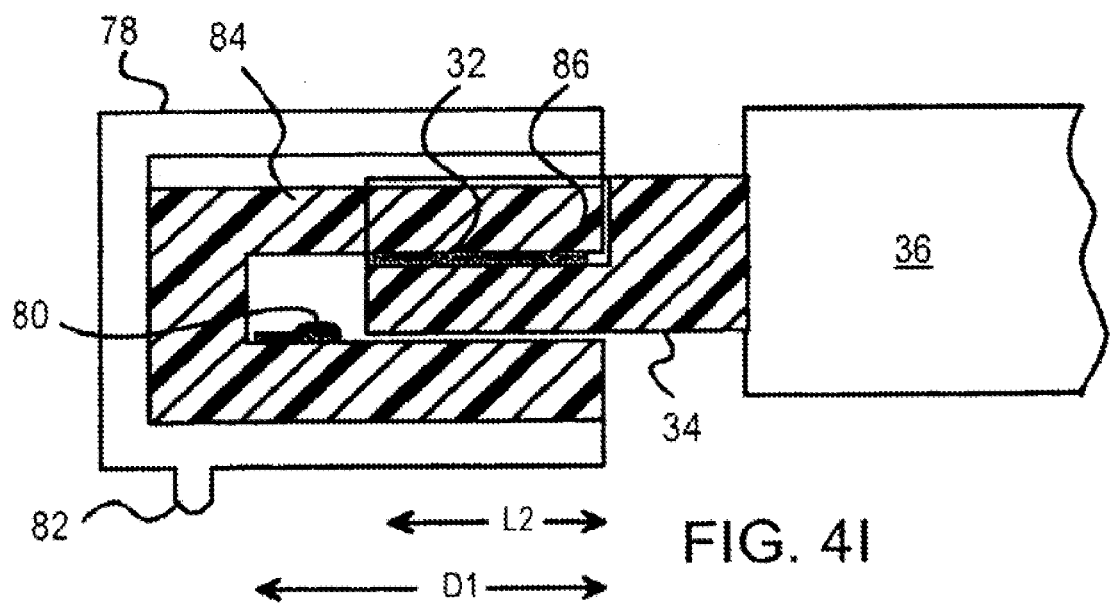

FIG. 4H shows, in accordance with an embodiment of the present invention, a standard USB connector just before insertion into the extended USB socket. When fully inserted, as shown in the embodiment of FIG. 4I, the tip of connector pin substrate 34 fits under socket pin substrate 84, but does not reach the back of the cavity. On the upper surface of connector pin substrate 34, metal contact pins 32 make contact with the four metal contact pins 86 of socket pin substrate 84. Extension metal contact pins 80 on the top of lower substrate extension 85 do not touch connector metal cover 33 since the depth of the extended USB socket is greater than the length L2 of the prior-art USB connector. Thus only the four standard USB pins (metal contact pins 32, 86) are electrically contacted.

Figure 5A:
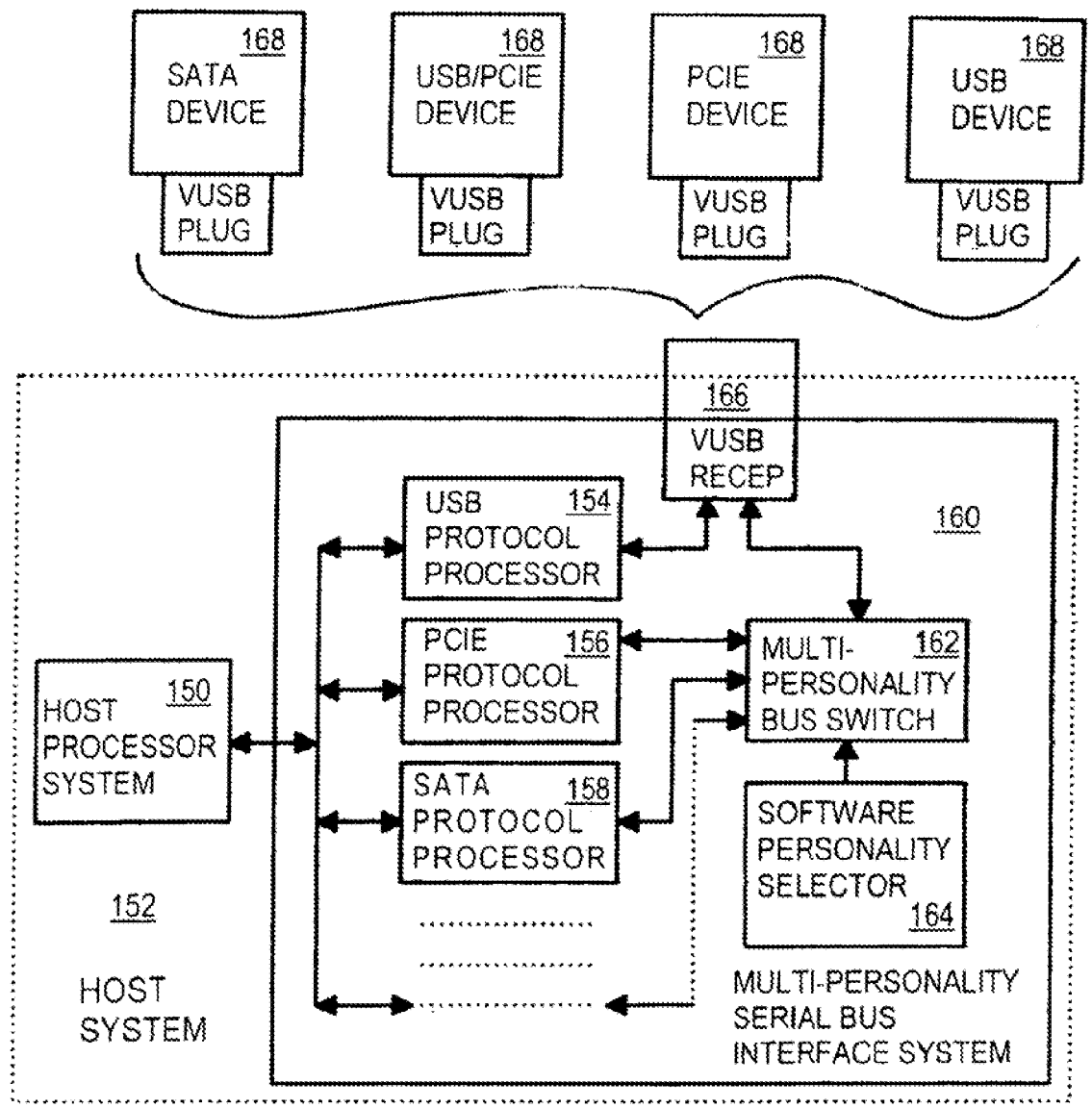
FIG. 5A shows, in accordance with an embodiment of the present invention a block diagram of a host with an extended-USB socket that supports extended-mode communication.

FIG. 5A shows, in accordance with an embodiment of the present invention, a block diagram of a host with an extended-USB socket that supports extended-mode communication. A variety of extended-USB or USB peripherals 168 may be plugged into extended-USB socket 166 of host 152. For example, a SATA peripheral, a PCI-Express peripheral, a Firewire IEEE 1394 peripheral, a Serial-Attached SCSI peripheral, or an USB-only peripheral could be inserted. Each can operate in its own standard mode.

Host 152 has processor system 150 for executing programs including USB-management and bus-scheduling programs. Multi-personality serial-bus interface 160 processes data from processor system 150 using various protocols. USB processor 154 processes data using the USB protocol, and inputs and outputs USB data on the USB differential data lines in extended USB socket 166.

The extended metal contact pins in extended USB socket 166 connect to multi-personality bus switch 162. Transceivers in multi-personality bus switch 162 buffer data to and from the transmit and receive pairs of differential data lines in the extended metal contacts for extended protocols such as PCI-Express, Firewire IEEE 1394, Serial-Attached SCSI, and SATA. When an initialization routine executed by processor system 150 determines that inserted peripheral 168 supports SATA, personality selector 164 configures multi-personality bus switch 162 to connect extended USB socket 166 to SATA processor 158. When the initialization routine executed by processor system 150 determines that inserted peripheral 168 supports PCI-Express, personality selector 164 configures multi-personality bus switch 162 to connect extended USB socket 166 to PCI-Express processor 156. Then processor system 150 communicates with either PCI-Express processor 156 or SATA processor 158 instead of USB processor 154 when extended mode is activated.

Figure 5B:
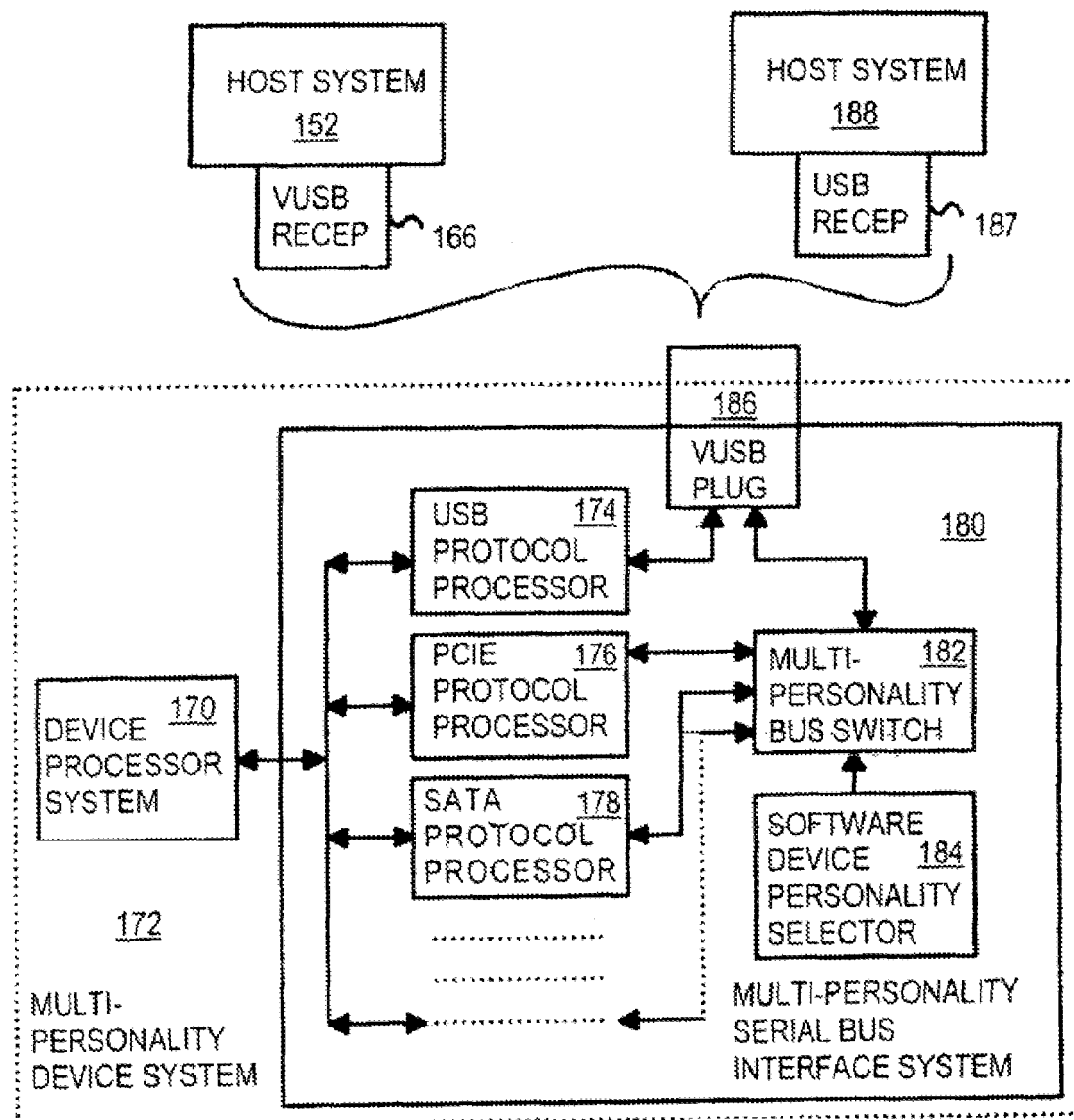
FIG. 5B shows, in accordance with an embodiment of the present invention, a block diagram of a peripheral with an extended-USB connector that supports extended-mode communication.

FIG. 5B shows, in accordance with an embodiment of the present invention, a block diagram of a peripheral with an extended-USB connector that supports extended-mode communication. Multi-personality peripheral 172 has extended USB connector 186 that could be plugged into extended-USB socket 166 of host 152 that has extended-mode communication capabilities such as SATA, 1394, SA-SCSI, or PCI-Express. Alternatively, extended USB connector 186 of multi-personality peripheral 172 could be plugged into standard-USB socket 187 of host 188 that only supports standard USB communication.

Multi-personality peripheral 172 has processor system 170 for executing control programs including USB-peripheral-control and response programs. Multi-personality serial-bus interface 180 processes data from processor system 170 using various protocols. USB processor 174 processes data using the USB protocol, and inputs and outputs USB data on the USB differential data lines in extended USB connector 186.

The extended metal contact pins in extended USB connector 186 connect to multi-personality bus switch 182. Transceivers in multi-personality bus switch 182 buffer data to and from the transmit and receive pairs of differential data lines in the extended metal contacts for extended protocols such as PCI-Express, 1394, SA SCSI (also referred to herein as SAS), and SATA. When a control or configuration routine executed by processor system 170 determines that host 152 has configured multi-personality peripheral 172 for SATA, personality selector 184 configures multi-personality bus switch 182 to connect extended USB connector 186 to SATA processor 178. When the initialization routine executed by processor system 170 determines that inserted peripheral 188 supports PCI-Express, personality selector 184 configures multi-personality bus switch 182 to connect extended USB connector 186 to PCI-Express processor 176. Then processor system 170 communicates with either PCI-Express processor 176 or SATA processor 178 instead of USB processor 174 when extended mode is activated.

If a PCI Express device with an extended USB plug is plugged into a host system with a conventional USB receptacle, nothing will be recognized if the PCI Express device does not support USB. The host system will not see anything that has plugged into the system. The same is true for a SATA-only device, etc.

FIG. 6 shows, in accordance with an embodiment of the present invention, a table of extended and standard pins in the extended USB connector and socket. The A side of the pin substrates contains the four standard USB signals, which include a 5-volt power signal and ground. The differential USB data D–, D+ are carried on pins 2 and 3. These pins are not used for extended modes.

Side B of the pin substrates, or the extension of the primary surfaces, carries the extended signals. Pin 1 is a 3.3-volt power signal for PCI-Express, Serial-ATA, and IEEE1394, while pin 2 is a 1.5-volt supply for PCI-Express and reserved for others. Pin 8 is a 12-volt power supply for SATA, and IEEE1394 and reserved for PCI-Express. Pin 5 is a ground.

Pins 3 and 4 carry the transmit differential pair, called PETn, PETp, for PCI-Express, T–, T+ for SATA. They also carry the B differential pair, TPB*, TPB, for IEEE 1394. Pins 6 and 7 carry the receive differential pair, called PERn, PERp, for PCI-Express, R–, R+ for SATA. They also carry the A differential pair, TPA*, TPA, for IEEE 1394.

The ExpressCard pins REFCLK+, REFCLK–, CPPE#, CPUSB#, CLKREQ#, PERST#, and WAKE# are not used in the extended USB connector to reduce the pin count. Additional pins could be added to the extended USB connector and socket if some or all of these pins are desired. In the implementation of FIG. 6, the SAS (Serial Attached SCSI) may be implemented in an analogous manner as the SATA pins.

Extended-Length Substrate with Pins on Same Side—FIGS. 7A-7H.

Figure 7A:
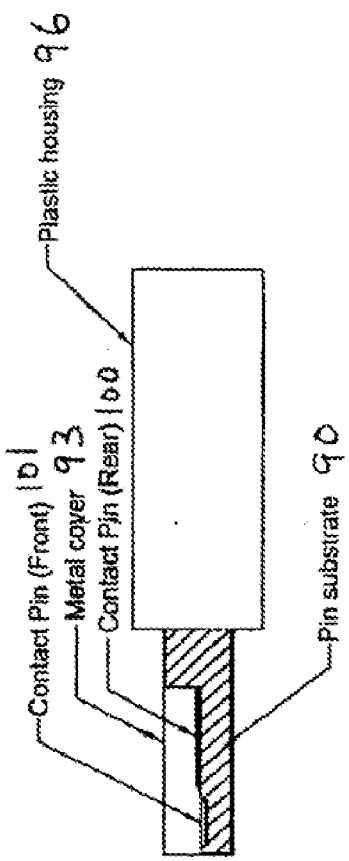

FIGS. 7A-H show a second embodiment of extended USB connectors and sockets having metal contact pins on just one of the surfaces of the pins substrates. In FIG. 7A, the extended connector has plastic housing 96 that the user can grip when inserting the connector plug into a socket. Pin substrate 90 supports metal contact pins 100, 101 on the top surface. Pin substrate 90 is an insulator such as ceramic, plastic, or other material. Metal leads or wires can pass through pin substrate 90 to connect metal contact pins 100, 101 to wires inside plastic housing 96 that connect to the peripheral device.

The length of pin substrate 90 is longer than the length L2 of pin substrate 34 in the prior-art USB connector of FIG. 3A. The extension in length can be 2-5 millimeters. Tip-end metal contact pins 101 are located mostly in the extension region beyond L2. Metal cover 93 is a rectangular or substantially rectangular tube that surrounds pin substrate 90 and has an open end.

In the example described below, pins 100 are for USB and pins 101 are for PCI-Express. It should be understood, however, that pins 101 may support any of the other protocols.

Figure 7B:
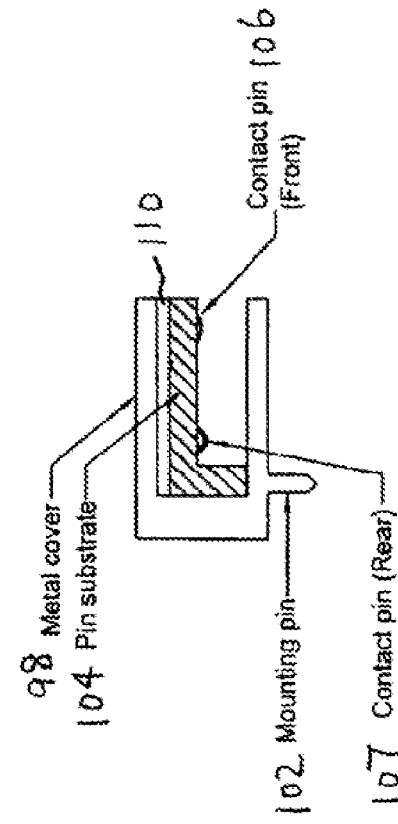
Figure 7D:
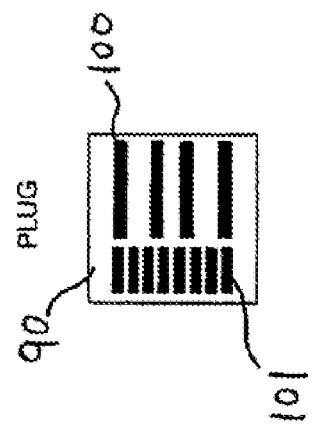

FIG. 7B shows, in accordance with an embodiment of the present invention, an extended-USB socket having metal contact pins on just one of the surfaces of the pin substrate. Pin substrate 104 has metal contact pins 106, 107 formed on a bottom surface facing a cavity that pin substrate 90 of the connector fits into. Pin substrate 104 does not need the lower substrate extension of FIG. 4, but can have the L-shape as shown.

Pins 107 are configured to contact with recessed pins in the pin substrate of the extended USB connector. For example, a bump or spring can be formed on extension metal contact pins 107, such as by bending flat metal pads. As shown, pins 106 and 107 are formed in two parallel rows, both of which are perpendicular to the longitudinal axis of the socket. In other words, while individual pins may run parallel to the longitudinal axis of the socket, the row that is formed runs perpendicular to this longitudinal axis. Pins 106, which carry USB signals, are disposed closer to the opening of the socket.

Metal cover 98 is a metal tube that covers pin substrate 104 and the opening underneath. Metal cover 93 of the USB connector fits in gaps 110 between metal cover 98 and the top and sides of pin substrate 104. Mounting pin 102 can be formed on metal cover 98 for mounting the extended USB socket to a PCB or chassis.

Figure 7C:
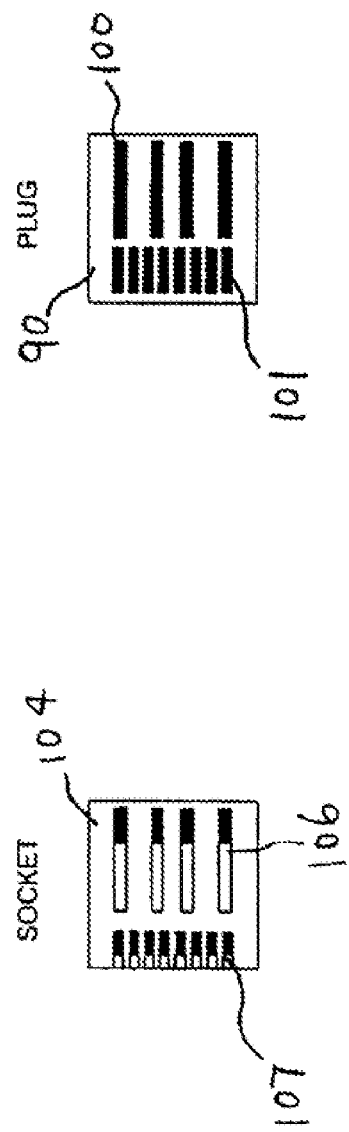

FIG. 7C shows, in accordance with an embodiment of the present invention, the bottom surface of socket pin substrate 104, which supports metal contact pins 106, 107. Primary metal contact pins 106, which include the four USB pins, are in a first row of 4 pins that are closest to the socket opening. Secondary metal contact pins 107 are in a second row of 8 pins that are farthest from the socket opening.

The 8 extension signals are carried by the second row of pins, secondary metal contact pins 107, which make contact with metal contact pins 101 of the plug. These 8 extension pins carry extended signals, such as for PCI-Express signals.

When the extended USB connector is fully inserted into the extended USB socket, the tip of pin substrate 90 fits into the cavity under pin substrate 104 of the extended USB socket. On the upper surface of connector pin substrate 90, metal contact pins 100 make contact with the 4 metal contact pins 106 of socket pin substrate 104, and metal contact pins 101 at the tip of the top surface of pin substrate 90 make contact with secondary extension metal contact pins 107 on the downward-facing surface of pin substrate 104.

Figure 7E:
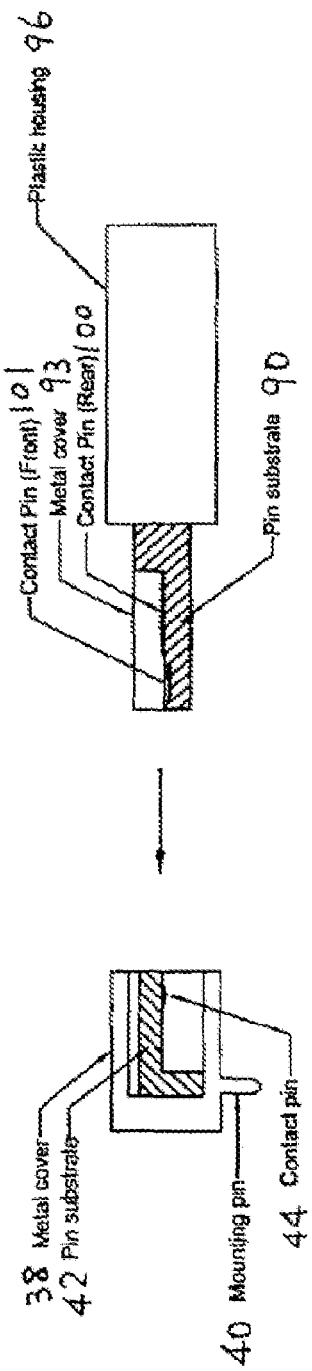
Figure 7F:
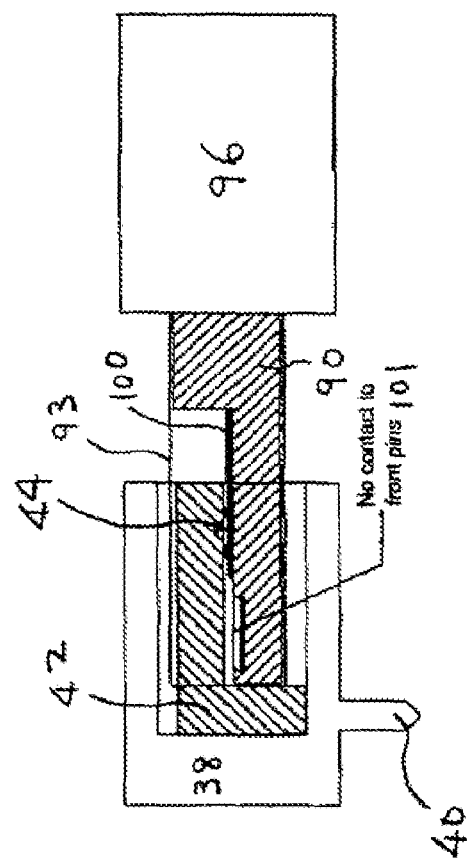

FIG. 7E shows, in accordance with an embodiment of the present invention, the extended USB connector just before insertion into a standard USB socket. When fully inserted, as shown in the embodiment of FIG. 7F, the tip of pin substrate 90 fits under socket pin substrate 42. On the upper surface of connector pin substrate 90, the metal contact pins 100 make contact with the four USB metal contact pins 44 of socket pin substrate 42. The front end row of metal contact pins 101 do not make contact with any metal contacts since they are recessed on connector pin substrate 90. Thus only the four standard USB pins (metal contact pins 44 and 100) are electrically contacted.

FIG. 7G shows, in accordance with an embodiment of the present invention, a standard USB connector just before insertion into the extended USB socket. When fully inserted, as shown in the embodiment of FIG. 7H, the tip of connector pin substrate 34 fits under socket pin substrate 104, but does not reach the back of the socket cavity. On the upper surface of connector pin substrate 34, metal contact pins 32 make contact with the four metal contact pins 106 of socket pin substrate 104. Secondary metal contact pins 107 on substrate 104 do not touch connector metal cover 33 since the depth of the extended USB socket is greater than the length L2 of the prior-art USB connector. Thus only the four standard USB pins (metal contact pins 32, 106) are electrically contacted. As can be seen, the extended USB connector and socket are electrically and mechanically compatible with standard prior-art USB sockets and connectors.

Figure 8:
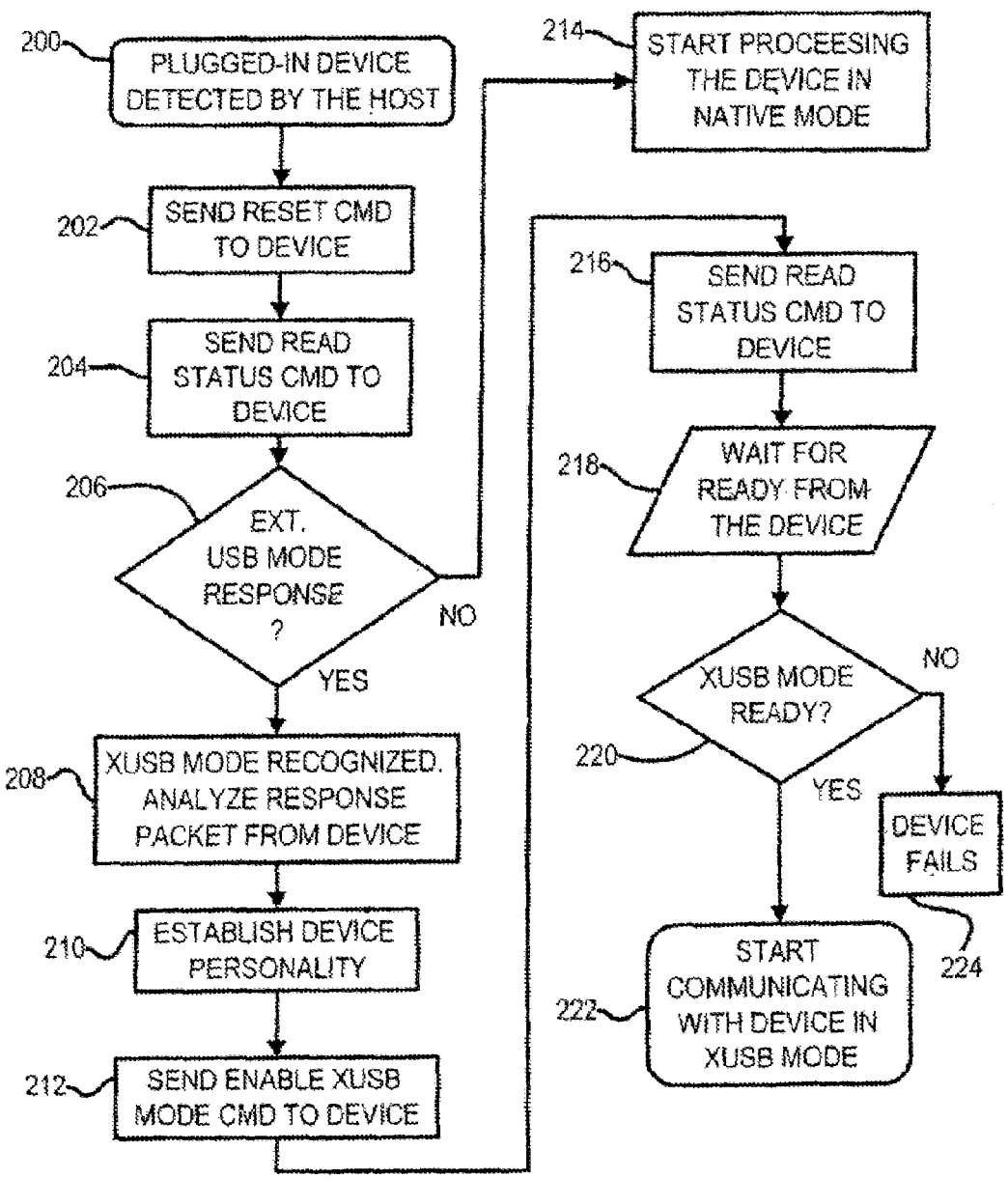
FIG. 8 shows, in accordance with an embodiment of the present invention, a flowchart of an initialization routine executed by a host for detecting a device plugged into an extended USB socket. The host can be multi mode or single mode.

FIG. 8, in accordance with an embodiment of the present invention, is a flowchart of an initialization routine executed by a host for detecting a device plugged into an extended USB socket. A host such as a PC can have an extended USB socket. Either an extended USB device, or a standard USB device can be plugged into the extended USB socket. This routine detects whether the inserted device supports extended-USB mode or only standard USB mode. The routine may be executed by processor system 150 of FIG. 5A.

The host detects a newly inserted device plugged into the extended USB socket, step 200, such as by detecting resistance changes on the metal contact pins of the extended USB socket. When the newly inserted device is detected, a USB reset command is sent over the USB differential signal lines to the device, step 202. A USB read-status command is then sent by the host, step 204.

The peripheral device responds by sending its status information using USB protocols. The host examines this status information, and in particular looks for a mode identifier indicating that the peripheral supports extended-USB mode. This mode identifier can be a status bit or a unique code in an area reserved for use by the peripheral vendor to identify the peripheral's type or capabilities.

When the peripheral responds with a status indicating no extended-USB support, step 206, then processing continues in native USB mode, step 214. Standard USB transactions are performed between the host and the peripheral using the differential USB data pins in the four-pin side of the extended USB socket. The peripheral likely has a standard USB connector that has only 4 metal contact pins, not the extension with the 8 additional metal contact pins.

When the peripheral responds with a status indicating extended-USB support, step 206, then the host further examines the packet from the peripheral to determine that the peripheral can support higher-speed communication using the extended metal contact pins, step 208. The peripheral has an extended USB connector with the 8 additional metal contact pins in an extension portion of the connector.

The host can further examine the capabilities of the peripheral, such as to determine which extended modes are supported, step 210. Some peripherals may support PCI-Express communication in extended mode, while other support Serial-ATA, Serial Attached SCSI, or IEEE 1394 as the extended-mode protocol.

The host then sends a vendor-defined USB OUT command to the peripheral step 212. This command instructs the peripheral to activate its extended mode of operation. The host verifies that the device received the command by reading its status again, step 216. The peripheral responds with a ready status, step 218. If the status read back from the device does not indicate that the peripheral is ready to switch to extended mode, step 220, then the device fails, step 224. The host could fall back on standard USB mode, step 214, or attempt again to activate extended mode, step 202. After trying a predetermined number of times, the host fall back on standard USB mode, step 214.

When the peripheral responds with the correct ready, step 220, then the host and peripheral can begin communicating in the extended mode. The 8 additional metal contact pins in the extended portion of the USB connector and socket are used for communication rather than the 4 USB metal contact pins. For example, the PCI-Express transmit and receive differential pairs can be used to bi-directionally send and receive data when the device has a PCI-Express personality. The host uses these extended pins to send a read-status command to the peripheral, step 222. Data can be sent and received at the higher rates supported by PCI-Express rather than the slower USB rates.

Figure 9:
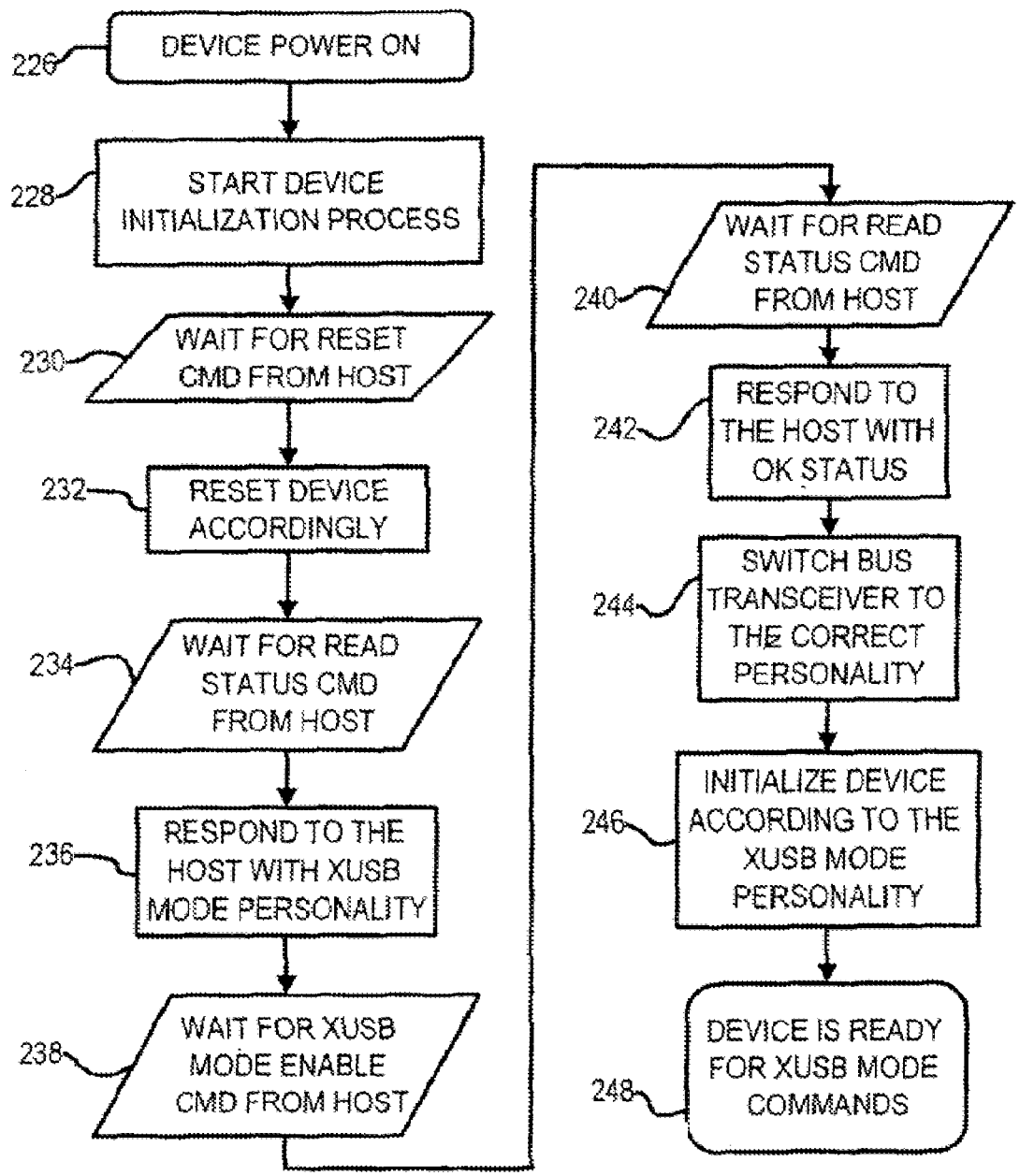
FIG. 9 shows, in accordance with an embodiment of the present invention, a flowchart of an initialization routine executed by a peripheral device plugged into an extended USB socket. The device can be multi mode or single mode.

FIG. 9 shows, in accordance with an embodiment of the present invention, a flowchart of an initialization routine executed by a peripheral device plugged into an extended USB socket. A peripheral can have an extended USB connector that can be plugged into either an extended USB socket or a standard USB socket. This routine executes on the peripheral device and helps the host detect that the inserted device supports extended-USB mode. The routine may be executed by peripheral-device processor system 170 of FIG. 5B.

When the peripheral device is plugged into the USB socket, power is received though the power and ground pins on the 4-pin USB portion of the connector, step 226. The peripheral device executes any initialization procedures to power itself up, step 228, and waits for a reset command from the host, step 230. Once the reset command is received from the host, the peripheral device resets itself, step 232.

The peripheral device waits for further commands from the host, step 234, such as a read-status command. The status read by the host, or further data read by the host can contain capability information about the peripheral device, such as which extended modes are supported, PCI-Express, SATA, IEEE 1394, SA SCSI, etc., step 236. The reset and read-status commands are standard USB commands from the host.

The peripheral device then waits for a command from the host to enable extended-mode communication, step 238. An enable command followed by another read-status command must be received, so the peripheral waits for the read-status command, step 240. Once the read-status command is received, the peripheral responds with an OK or READY status to indicate that it is ready to switch to using the extended metal contact pins on the connector, step 242.

Then the peripheral device switches its bus transceivers to match the bus-protocol specified by the host to be able to communicate over the 8 extension metal contact pins, step 244. The 4 USB metal contact pins are not used. The peripheral device waits for a read-status command sent by the host over the extended metal contact pins and responds to this read-status command, step 246, initializing for the new protocol mode. The peripheral device can then receive extended commands such as PCI-Express commands that are received over the extended metal contact pins on the extended portion of the connector, such as the PCI-Express transmit and receive differential lines, step 248.

For single mode, the USB pins can be removed. For example, pins 88 in FIGS. 4A and 4C and pins 86 in FIGS. 4B and 4D can be removed. They do not absolutely have to be removed though because if no trace is connected to them, these pins will not do any harm.

Figure 10:
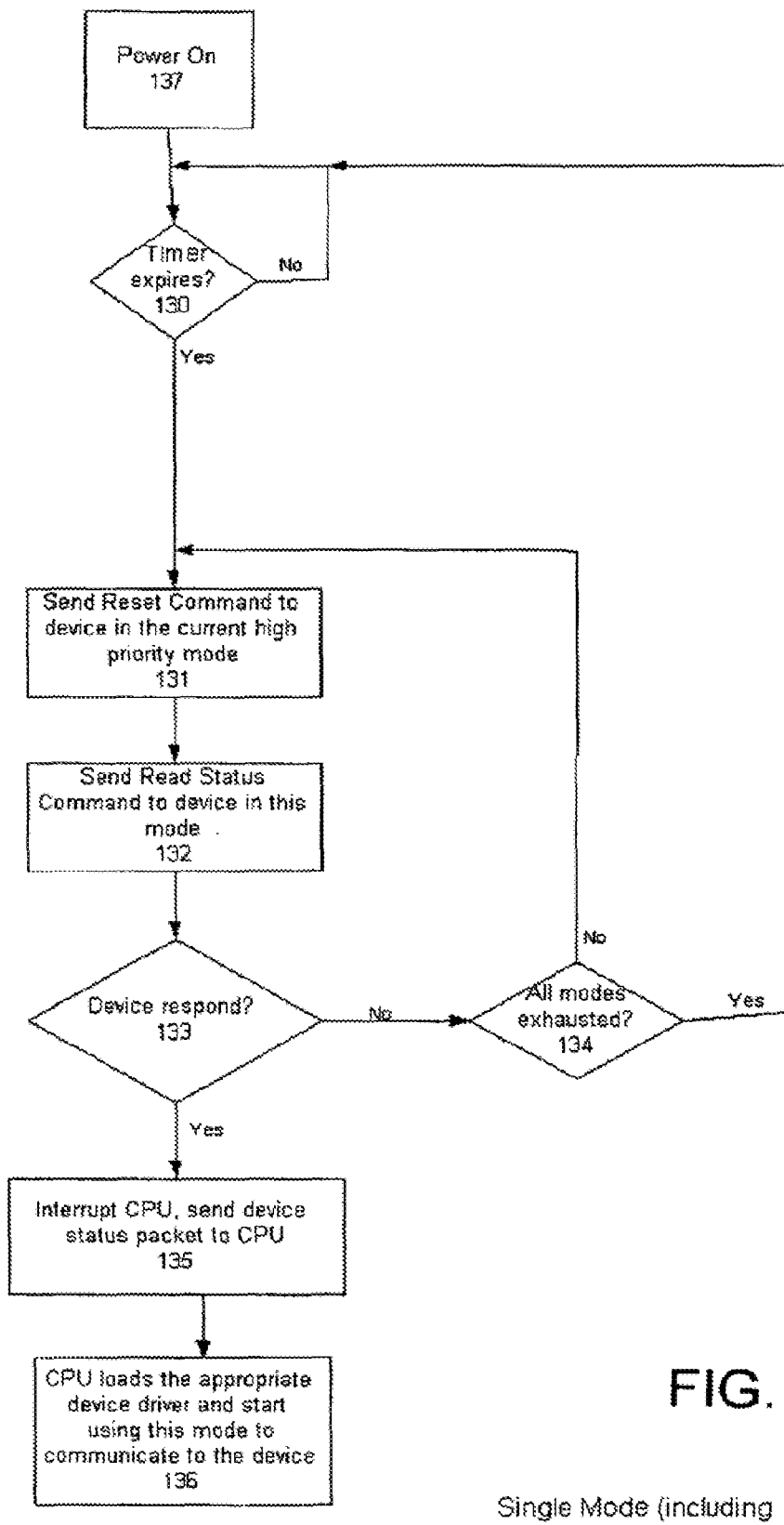
FIG. 10 shows, in accordance with an embodiment of the present invention, a flowchart of an initialization routine executed by a host for detecting a device plugged into an extended USB socket. The host can be single mode or 1 side multi mode.

FIG. 10 shows, in accordance with an embodiment of the present invention, a flowchart of an initialization routine executed by a single or one-sided multi mode host for detecting a device plugged into an extended USB socket. Single mode means only 1 mode, excluding the conventional USB mode. One-sided multi mode means that in the extended connectors 72 in 4A, there are multiple modes supported. A host such as a PC can have an extended USB socket. Either an extended USB device, or a single mode device can be plugged into the extended USB socket. Connectors 88 in FIG. 4A can be saved. If these connectors physically exist, then they are not employed when the host communicates using a non-USB (extended) mode.

This routine figures out which mode should be used for communication. The routine may be executed by a dedicated state machine or a microcontroller (not shown in FIG. 5A).

A timer is implemented in firmware or hardware. When the timer expires, step 130, this routine is executed. It sends a reset command to the EUSB (extended USB) connectors (which may or may not have a device plugged in) in the current highest priority mode, step 131. Then it sends read status command to the connectors, step 132. If the device does not exist or does not respond, it will figure out if all of its modes are exhausted or not, step 134. If they are not exhausted, then it will send the reset command with the next priority mode, step 131 again, etc. If they are exhausted, then it jumps to restart the timer again and wait for the timer to expire, step 130 again.

If the device respond, that means the device can talk in the current mode. The microcontroller will interrupt the CPU and send the device status packet back to CPU, step 135. The host CPU will load the appropriate device driver and start using this mode to communicate to the device directly, step 136.

Figure 11:
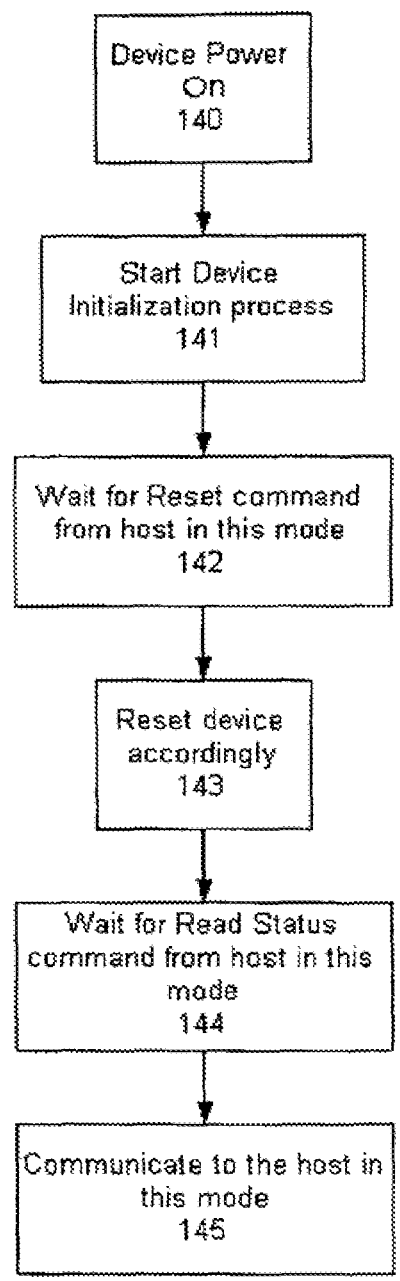
FIG. 11 shows, in accordance with an embodiment of the present invention, a flowchart of an initialization routine executed by a peripheral device plugged into an extended USB socket. The device is single mode.

FIG. 11 shows, in accordance with an embodiment of the present invention, a flowchart of an initialization routine executed by a single mode peripheral device plugged into an extended USB socket. A peripheral can have an extended USB connector that can be plugged into an extended USB socket. This routine executes on the peripheral device. The routine may be executed by peripheral-device processor system 170 of FIG. 5B.

When the peripheral device is plugged into the USB socket, power is received though the power and ground pins on the 8-pin extended portion of the connector, step 140. The peripheral device executes any initialization procedures to power itself up, step 141, and waits for a reset command from the host, step 142. Once the reset command is received from the host, the peripheral device resets itself, step 143.

The peripheral device waits for further commands from the host, step 144, such as a read-status command. The device will respond to this command using its only mode, step 145.

Several other embodiments are contemplated by the inventors. For example, a variety of materials may be used for the connector substrate, circuit boards, metal contacts, metal case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes. The metal cover can have the clips and slots that match prior-art USB connectors.

FIG. 12 shows, in accordance with an embodiment of the present invention, an arrangement that reduced 2 pins, as compared to the implementation of FIG. 6. In the embodiment of FIG. 12, the SAS pins may be implemented in an analogous manner as SATA. Other embodiments that increase or decrease the number of secondary pins are also possible.

ExpressCard can use the same mechanism described above to include SATA, SAS and 1394. They can be overlapped with the PCI Express signals.

A third embodiment of extended-function USB connectors and sockets using extended pins on a pivoting substrate attached to the socket's pin substrate can be used. The length and depth do not have to be extended in this embodiment, or can be extended less than the embodiments of FIGS. 4, 7.

The connector can have plastic housing that the user can grip when inserting the connector plug into a socket. Pin substrate supports metal contact pins on the top surface. Pin substrate is an insulator such as ceramic, plastic, or other material. Metal leads or wires can pass through pin substrate to connect metal contact pins to wires inside plastic housing that connect to the peripheral device.

Reverse-side metal contact pins are placed in a recess in the bottom side of pin substrate near the tip of the connector plug and can have raised ribs on each side to prevent contact with the spring-like clips on the metal cover of the standard USB socket. Reverse-side metal contact pins are additional pins for extended signals such as for PCI-Express signals. Metal leads or wires can pass through pin substrate to connect reverse-side metal contact pins to wires inside plastic housing that connect to the peripheral device.

The length of pin substrate can be the same as the length L2 of pin substrate 34 in the prior-art USB connector of FIG. 3A, or can be slightly longer. Reverse-side metal contact pins are located near the tip of the connector plug. Hole or notch is also provided on the reverse-side, but farther back from the tip of the plug. Two notches can be provided.

Metal cover is a rectangular tube that surrounds pin substrate and has an open end. A large opening or several smaller openings in metal cover on the bottom of pin substrate allows reverse-side metal contact pins and notches to be exposed.

An extended-USB socket can have retractable metal contact pins on the lower surface of the pin substrate. Pin substrate has metal contact pins formed on a cavity-top surface facing downward to a cavity that pin substrate of the connector fits into. Pin substrate also has lower substrate extension that is not present on the prior-art USB socket, which has an L-shaped pin substrate.

Extension metal contact pins are mounted on lower substrate extension near the rear of the cavity. A bump or spring can be formed on extension metal contact pins, such as by bending flat metal pads. This bump allows extension metal contact pins to reach reverse-side metal contact pins which are recessed in pin substrate of the connector.

Extension metal contact pins are mounted on a small, pivoting substrate that is connected to or part of a mechanical switch. A bend or bump near the socket-opening end of a mechanical switch is depressed by a connecter inserted into the socket opening. As the mechanical switch is depressed, one end of pivoting substrate is pushed downward, causing extension metal contact pins to pivot downward. Extension metal contact pins do not make contact with metal cover when the mechanical switch is depressed. This pivoting caused by the mechanical switch prevents extension metal contact pins from shorting to the metal cover on a standard USB connector.

A cavity is formed by the bottom surface of the pin substrate and the top surface of lower substrate extension and the back of the pin substrate that connects to the lower substrate extension. The depth of this cavity can be the same or somewhat greater than the depth D2 of the prior-art USB socket of FIG. 3B. Metal cover is a metal tube that covers the pin substrate and the lower substrate extension. Metal cover of the USB connector fits in gaps between the metal cover and the top and sides of pin substrate. Mounting pin can be formed on the metal cover for mounting the extended USB socket to a PCB or chassis.

Rather than use PCI-Express, the extended USB connector/socket can use serial ATA, Serial Attached SCSI, or Firewire IEEE 1394 as the second interface. The host may support various serial-bus interfaces as the standard interface, and can first test for USB operation, then IEEE 1394, then SATA, then SA SCSI, etc, and later switch to a higher-speed interface such as PCI-Express. During extended mode when the 8 extended contacts are being used for the extended protocol, the 4 USB contacts can still be used for USB communication. Then there are two communication protocols that the host can use simultaneously.

In the examples, USB series A plugs and receptacles are shown. However, the invention is not limited to Series A. Series B, Series mini-B, or Series mini-AB can be substituted. Series B uses both upper and lower sides of the pin substrate for the USB signals. The left-side and right-side of the pin substrate can be used for the additional 8 pins. Series mini-B and Series mini-AB use the top side of the pin substrate for the USB signals. The additional 8 pins can be placed on the bottom side of the pin substrate 34 for these types of connectors. The extended USB connector, socket, or plug can be considered a very-high-speed USB connector (VUSB) connector since the higher data-rates of PCI-Express or other fast-bus protocols are supported with a USB connector.

A special LED can be designed to inform the user which electrical interface is currently in use. For example, if the standard USB interface is in use, then this LED can be turned on. Otherwise, this LED is off. If more than 2 modes exist, then a multi-color LED can be used to specify the mode, such as green for PCI-Express and yellow for standard USB.

Figure 13:
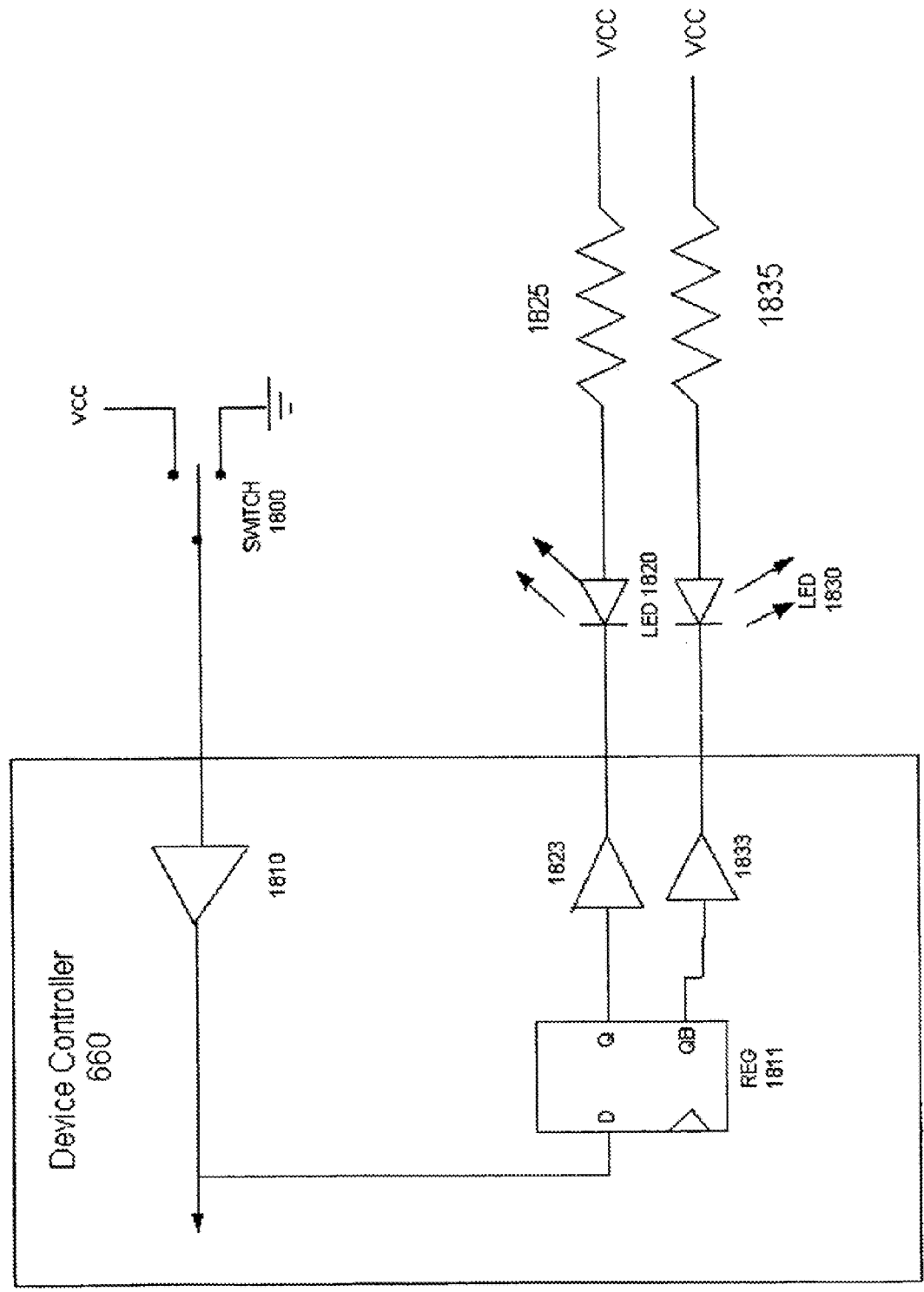
FIGS. 13, 14 and 15 show LED circuitry for indicating mode in a device having a EUSB connector.

For example, if a device such as an Express Card can communicate using either the USB or PCI Express mode, a hardware switch may be employed to select the mode, and an LED Logic circuit may indicate the communication mode to the user. FIG. 13 shows one such implementation. The basic LED circuit includes a photo LED, current limiting resistor and a buffer within the controller. The LED will be on whenever there is a current flowing across it from the cathode to anode. The detect and LED buffer may be implemented with general purpose input/output (GPIO) port, for example.

In FIG. 13, the USB mode is selected with SW1 switched to VCC; whereas PCI Express mode is selected with SW1 switched to ground. The selected mode is then stored to configuration register REG1 via the detect circuit. As shown, there are two LEDs for mode indication, i.e. LED 1830 will be turned on when USB mode is selected. Otherwise, LED 1820 will be on for PCI Express mode.

Figure 14:
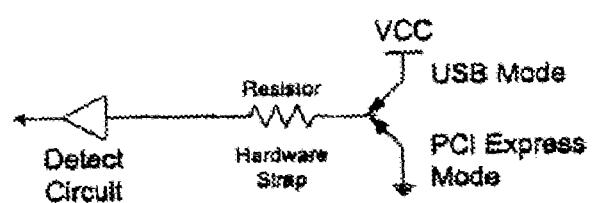
Figure 15:
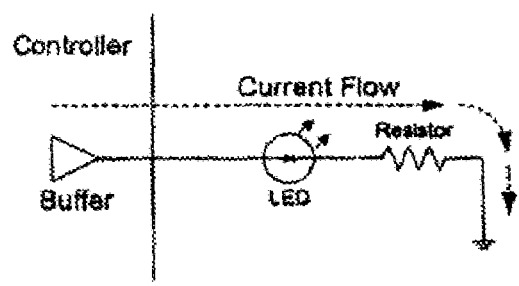

Alternatively, hardware strapping may be employed to indicate the communication mode of such multi-protocol capable device. FIG. 14 shows one implementation of hardware strapping. As a further alternative, the mode of protocol may be directly programmed into configuration without the need for hardware switch. During the device configuration stage, the software may store the mode setting from auto mode detection (if the device has an intelligent algorithm to determine the proper mode) or may download the mode setting from a non-volatile storage device, for example. As a further alternative, the LED circuit portion of FIG. 13 may be implemented by the LED circuit of FIG. 15 wherein the device controller sources current into the LED when the buffer output is driven high.

Figure 16:
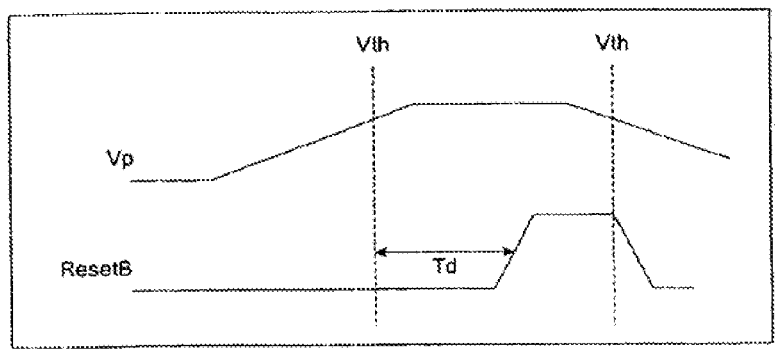
FIG. 16 shows a timing diagram to facilitate discussion of reset signal generation.
Figure 17:
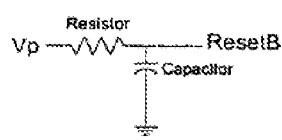
FIGS. 17 and 18 show reset circuitry for use in resetting a device having a EUSB connector.
Figure 18:
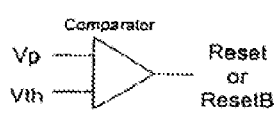

There are times when it may be desirable to generate a clean reset signal for the peripheral device. For example, if the power supply voltage drops below a threshold voltage, it may be desirable to assert a reset signal and keep the reset signal asserted for some time interval (Td) after the power supply voltage rises above the threshold voltage to give the multi-personality device time to stabilize itself (see FIG. 16). One way to implement the reset circuit involves and RC circuit, such as that shown in FIG. 17. However, it is also possible to implement the reset circuit using a voltage comparator if more precision is desired. In the voltage comparator implementation of FIG. 18; the divided supply voltage (Vp) is compared to the threshold voltage (Vth), and the reset signal is asserted whenever Vp is below Vth. The reset output may be either active high or active low. The reset output may be configured as either push/pull or open drain.

In some cases, it may be desirable to endow the peripheral device with user-settable write-protect indication to prevent the unintentionally alteration of the information, such as information stored in storage device (e.g., removable flash media). An implementation of the write protect logic may include a write protect switch and a detect circuit.

Figure 19A:
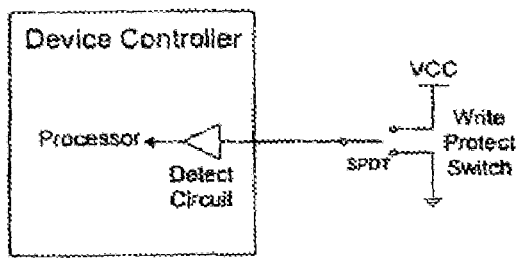
FIGS. 19A, 19B and 19C illustrate respectively implementations using a single position double throw (SPDT) switch, a single pole single throw (SPST) switch, and another single pole single throw (SPST) switch to provide for write protect logic for a device having an EUSB connector.
Figure 19B:
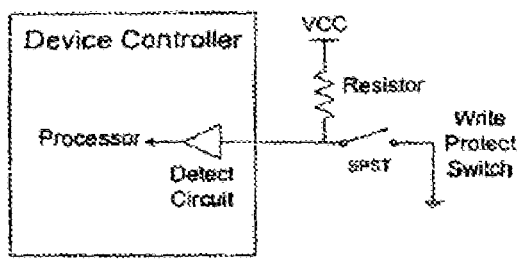
Figure 19C:
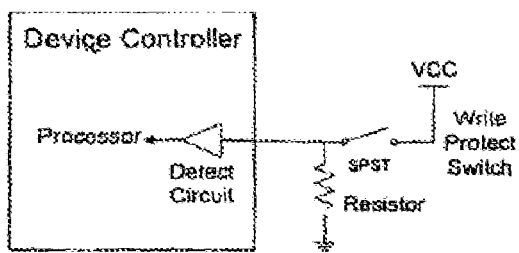

In one embodiment, the user may manually set the write protect switch to produce to the detect circuit two electrical polarities, i.e. enable or disable. The detect circuit normally may be an input port or general purpose input/output (GPIO) port of the device controller. The detected polarity is then used to instruct the processor to govern the write behavior to the storage subsystem of the peripheral device. In other words, the write access is prohibited if the write protect switch is enabled; otherwise the write access is allowed. FIGS. 19A, 19B and 19C illustrate respectively implementations using a single pole double throw (SPDT) switch, a single pole single throw (SPST) switch whereby the pull up resistor sets the default polarity as high, and single pole single throw (SPST) switch whereby a pull down resistor sets the default polarity as low.

Alternative implementations to those explicitly discussed above are also possible. For example, the pivoting substrate can pivot along a hinge or other connection at the back of the socket, or can have a spring or springs under it that are depressed, causing the pivoting substrate to move downward in a more parallel and less pivoting manner. Other variations and exact implementations are possible.

The longer metal contact pins on the edges can be used to carry ground, while the shorter metal contact pins in the middle can be used to carry power and other signals, such as shown in FIG. 4D. The longer metal contact pins make contact first, allowing ground to be connected before power. This improves hot-plug reliability.

Applications can include flash drives, USB connectors on desktop computers, notebook computers, Pocket PC's, Handy Terminals, Personal Communicators, PDA's, digital cameras, cellular phones with or without digital cameras, TV set-up boxes, MP3, MPEG4, copiers, printers, and other electronic devices. Such devices may use to advantage the higher speed offered by the extended modes of the extended USB connectors and sockets, and may reduce size and space together with lower cost compared with larger card-type and dual-plug connectors. Legacy USB devices and hosts are supported, so the extended hosts and peripherals can freely operate with other legacy peripherals and hosts using standard USB mode.

Additional metal contacts can be added to the new connectors and sockets. These additional metal contacts can serve as power, ground, and/or I/O pins which are further extensions to the USB specification, or PCI Express or other specificiations. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered.

Extra I/O pins can be added for higher bandwidth and data transfer speeds. The additional I/O pins can be used for multiple-bit data I/O communications, such as 2, 4, 8, 12, 16, 32, 64, ... bits. By adopting some or all of these new features, performance of hosts and peripheral devices can be significantly improved. These additional pins could be located behind or adjacent to the existing USB pins, or in various other arrangements. The additional pins could be applied to male and female connectors.

To reduce the number of extended pins, the four original USB pins can be shared. One embodiment has a total of 10 pins. Two of the differential signal pins for PCI-Express, Serial-ATA, and IEEE 1394 can be shared with the 2 differential data pins of USB. The same scheme can be applied to the ExpressCard connector. There is no change for the 4 pins related to USB. For the PCI Express signals, only PETn, PETp, PERn and PERp need to be modified to include the corresponding signals for 1394, SATA and SA-SCSI. Other PCI-related signals can be mapped also.

Clock signals such as REFCLK+ and REFCLK− are important signals to add if additional pins are available. If even more pins are available, the side band signals in Express-Card can be added, like CPPE#, CPUSB#, CLKREQ#, PERST#, WAKE#, +3.3AUX, SMBDATA, SMBCLK, etc.

The approach of using the modified PCI Express signals can be applied to the designs of the fully buffered memory modules of DRAMs.

One alternative to double the transfer bandwidth of the USB is to increase the USB clock frequency from 480 MHz to 960 MHz. This alternative does not need any additional pin. Nothing needs to be changed for the USB mechanical standard.

Another alternative to double the transfer bandwidth of USB is described below. Refer to FIG. 4C, the additional 8 pins can be reduced to a minimum of 2 pins. These additional 2 pins can be used to carry another differential pair of data for the USB. With 2 pairs of differential data lines, the transfer speed can be doubled.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An extended Universal-Serial-Bus (USB) plug, comprising:
   an extended pin substrate having an extended substrate length longer than a length of a pin substrate of an industry-standard Series A USB connector, said length of said pin substrate of said industry-standard Series A USB connector being about 12 mm;
   a plurality of USB connector contacts arranged in a first row in a direction perpendicular to a longitudinal axis of said extended USB plug, said plurality of USB connector contacts being disposed on said pin substrate of said industry-standard Series A USB connector and configured to carry USB signals;
   a plurality of non-USB connector contacts arranged in a second row parallel to said first row, said plurality of non-USB connector contacts being configured to carry non-USB signals; and
   wherein said extended USB plug is configured to be mechanically and electrically compatible with both an industry-standard Series A USB socket and an extended USB socket, said extended USB socket including an extended cavity having an extended cavity length longer than a length of a cavity of said industry-standard Series A USB socket, said length of said cavity of said industry-standard Series A USB socket being about 9 mm, and wherein said plurality of non-USB connector contacts being disposed in a first position relative to said plurality of USB connector contacts, said first position representing a position that is on the opposite substrate side relative to said plurality of USB connector contacts, thereby preventing said plurality of non-USB connector contacts from electrically coupling with said plurality of USB socket contacts configured to carry said USB signals in said industry-standard Series A USB socket when said extended USB plug is fully inserted into said industry-standard Series A USB socket, said first row being positioned on said extended pin substrate so as to enable said plurality of USB connector contacts to electrically couple with respective ones of said plurality of USB socket contacts when said extended USB plug is fully inserted into said industry-standard Series A USB socket.

2. The extended USB plug of claim 1 wherein said first row is disposed on a first side of said extended pin substrate.

3. The extended USB plug of claim 2 wherein said plurality of non-USB connector contacts in said second row are recessed below a surface of a second side, said second side being opposite of said first side, said second row is disposed further toward a distal end of said extended pin substrate than said first row, and said plurality of non-USB connector contacts include at least one of 8 contacts and 6 contacts.

4. The extended USB plug of claim 1 wherein said plurality of non-USB connector contacts are configured to be electrically coupled to a first socket-residing row of non-USB socket contacts in said extended USB socket having two socket-residing rows of contacts when said extended USB plug is fully inserted into said extended USB socket, said first socket-residing row of said non-USB socket contacts being configured to carry said non-USB signals, said non-USB signals represent one of a set of PCI-EX signals, a set of SATA signals, a set of SAS signals, and a set of 1394 signals, a second socket-residing row of said two socket-residing rows of contacts represent said plurality of USB socket contacts configured to carry said USB signals, said plurality of USB connector contacts being configured to be electrically coupled with said plurality of USB socket contacts when said extended USB plug is fully inserted into said extended USB socket.

5. The extended USB plug of claim 4 wherein said plurality of non-USB connector contacts in said second row are recessed below a surface of a first side, said second row being disposed further toward a distal end of said extended pin substrate than said first row, wherein said plurality of non-USB connector contacts include at least one of 8 contacts and 6 contacts.

6. An extended Universal-Serial-Bus (USB) plug, comprising:
   an extended pin substrate made from an insulated material, said extended pin substrate having an extended substrate length longer than a length of a pin substrate of an industry-standard Series A USB connector, said length of said pin substrate of said industry-standard Series A USB connector being about 12 mm;
   a plurality of USB connector contacts arranged in a first row in a direction perpendicular to a longitudinal axis of said extended USB plug, said plurality of USB connector contacts being disposed on said pin substrate of said industry-standard Series A USB connector and configured to carry USB signals;
   a plurality of non-USB connector contacts arranged in a second row parallel to said first row, said plurality of non-USB connector contacts being configured to carry non-USB signals; and
   wherein said extended USB plug is configured to be mechanically and electrically compatible with both an industry-standard Series A USB socket and an extended USB socket, said extended USB socket including an extended cavity having an extended cavity length longer than a length of a cavity of said industry-standard Series A USB socket, said length of said cavity of said industry-standard Series A USB socket being about 9 mm, and wherein said plurality of non-USB connector contacts being disposed in a first position relative to said plurality of USB connector contacts, said first position representing a position that is on the opposite substrate side relative to said plurality of USB connector contacts, thereby preventing said plurality of non-USB connector contacts from electrically coupling with a plurality of USB socket contacts configured to carry said USB signals in said industry-standard Series A USB socket when said extended USB plug is fully inserted into said industry-standard Series A USB socket, said first row being positioned on said extended pin substrate so as to enable said plurality of USB connector contacts to electrically couple with respective ones of said plurality of USB socket contacts when said extended USB plug is fully inserted into said industry-standard Series A USB socket.

7. The extended USB plug of claim 6 wherein said first row is disposed on a first side of said extended pin substrate.

8. The extended USB plug of claim 7 wherein said plurality of non-USB connector contacts in said second row are recessed below a surface of a second side, said second row are disposed on said second side of said extended pin substrate opposite said first side, wherein said second row is disposed further toward a distal end of said extended pin substrate than said first row, and said plurality of non-USB connector contacts include at least one of 8 contacts and 6 contacts.

9. The extended USB plug of claim 6 wherein said plurality of non-USB connector contacts are configured to be electrically coupled to a first socket-residing row of non-USB socket contacts in an extended USB socket having two socket-residing rows of contacts when said extended USB plug is fully inserted into said extended USB socket, said first socket-residing row of said non-USB socket contacts being configured to carry said non-USB signals, said non-USB signals represent one of a set of PCI-EX signals, a set of SATA signals, a set of SAS signals, and a Set of 1394 signals, a second socket-residing row of said two socket-residing rows of contacts represent said plurality of USB socket contacts configured to carry said USB signals, said plurality of USB connector contacts being configured to be electrically coupled with said plurality of USB socket contacts when said extended USB plug is fully inserted into said extended USB socket.

10. The extended USB plug of claim 9 wherein said second row being disposed further toward a distal end of said extended pin substrate than said first row.

11. The extended USB plug of claim 10 wherein said plurality of non-USB connector contacts includes at least one of 8 contacts and 6 contacts.

12. An extended Universal-Serial-Bus (USB) socket, comprising:
   an extended cavity having an extended cavity length longer than a length of a cavity of an industry-standard Series A USB socket, said length of said cavity of said industry-standard Series A USB socket being about 9 mm;
   a plurality of USB socket contacts arranged in a first row in a direction perpendicular to a longitudinal axis of said extended USB socket, said plurality of USB socket contacts being disposed in said cavity of said industry-standard Series A USB socket and configured to carry USB signals;
   a plurality of non-USB socket contacts arranged in a second row parallel to said first row, said plurality of non-USB socket contacts being configured to carry non-USB signals; and
   wherein said extended USB socket is configured to be mechanically and electrically compatible with both an industry-standard Series A USB connector and an extended USB plug, said extended USB plug including an extended pin substrate having an extended substrate length longer than a length of a pin substrate of said industry-standard Series A USB connector, said length of said pin substrate of said industry-standard Series A USB connector being about 12 mm, and wherein said plurality of non-USB socket contacts being disposed in a first position relative to said plurality of USB socket contacts, said first position representing a position that is on the opposite substrate side relative to said plurality of USB socket contacts, thereby said plurality of non-USB socket contacts in said second row are positioned such that no portion of said industry-standard Series A USB connector would physically contact said second row when said industry-standard Series A USB connector is fully inserted into said extended USB socket, said first row being positioned in said extended cavity so as to enable a plurality of USB connector contacts of said industry-standard Series A USB connector to electrically couple with respective ones of said plurality of USB socket contacts when said industry-standard Series A USB connector is fully inserted into said extended USB socket.

13. The extended USB socket of claim 12 wherein said first row is disposed on a first interior wall of said extended cavity and said second row being disposed on a second interior wall, said second interior being located opposite of said first interior wall, said plurality of non-USB socket contacts in said second row are configured to electrically couple with recessed contacts in a connector when said connector is fully inserted into said extended USB socket, said recessed contact being recessed below a surface of a pin substrate of said connector, said second row is disposed further away from an opening of said extended cavity than said first row, said plurality of non-USB socket contacts include at least one of 8 contacts and 6 contacts.

14. The extended USB socket of claim 12 wherein said plurality of non-USB socket contacts are configured to be electrically coupled to a first connector-residing row of non-USB connector contacts on said extended USB plug having two connector-residing rows of contacts when said extended USB plug is fully inserted into said extended USB socket, said first connector-residing row of said non-USB connector contacts being configured to carry said non-USB signals, said non-USB signals represent one of a set of PCI-EX signals, a set of SATA signals, a set of SAS signals, and a set of 1394 signals, a second connector-residing row of said two connector-residing rows of contacts represent USB connector contacts configured to carry said USB signals, said plurality of USB socket contacts being configured to be electrically coupled with said USB connector contacts when said extended USB plug is fully inserted into said extended USB socket.

15. The extended USB socket of claim 14 wherein said plurality of non-USB socket contacts in said second row are configured to make electrical contact with recessed pins of said first connector-residing row, said second row being disposed further away from an opening of said extended cavity than said first row, said plurality of non-USB socket contacts include at least one of 8 contacts and 6 contacts.

16. An extended Universal-Serial-Bus (USB) socket, comprising:
   an extended cavity having an extended cavity length longer than a length of a cavity of an industry-standard Series A USB socket, said length of said cavity of said industry-standard Series A USB socket being about 9 mm;
   a plurality of USB socket contacts arranged in a first row in a direction perpendicular to a longitudinal axis of said extended USB socket, said plurality of USB socket contacts being disposed in said cavity of said industry-standard Series A USB socket and configured to carry USB signals;
   a plurality of non-USB socket contacts arranged in a second row parallel to said first row, said plurality of non-USB socket contacts being configured to carry non-USB signals; and
   wherein said extended USB socket is configured to be mechanically and electrically compatible with both an industry-standard Series A USB connector and an extended USB plug, said extended USB plug including an extended pin substrate made from an insulated material, said extended pin substrate having an extended substrate length longer than a length of a pin substrate of said industry-standard Series A USB connector, said length of said pin substrate of said industry-standard Series A USB connector being about 12 mm, and wherein said plurality of non-USB socket contacts being disposed in a first position relative to said plurality of USB socket contacts, said first position representing a position that is on the opposite substrate side relative to said plurality of USB socket contacts, thereby said plurality of non-USB socket contacts in said second row are positioned such that no portion of said industry-standard Series A USB connector would physically contact said second row when said industry-standard Series A USB connector is fully inserted into said extended USB socket, said first row being positioned in said extended cavity so as to enable a plurality of USB connector contacts of said industry-standard Series A USB connector to electrically couple with respective ones of said plurality of USB socket contacts when said industry-standard Series A USB connector is fully inserted into said extended USB socket.

17. The extended USB socket of claim 16 wherein said first row is disposed on a first interior wall of said extended cavity, said second row are disposed on a second interior wall of said extended cavity opposite said first interior wall.

18. The extended USB socket of claim 17 wherein said plurality of non-USB socket contacts in said second row are configured to electrically couple with recessed contacts in a connector when said connector is fully inserted into said extended USB socket, said recessed contact being recessed below a surface of a second side of a pin substrate of said connector, said second row is disposed further away from an opening of said extended cavity than said first row, said plurality of non-USB socket contacts include at least one of 8 contacts and 6 contacts.

19. The extended USB socket of claim 16 wherein said plurality of non-USB socket contacts are configured to be electrically coupled to a first connector-residing row of non-USB connector contacts on said extended USB plug having two connector-residing rows of contacts when said extended USB plug is fully inserted into said extended USB socket, said first connector-residing row of said non-USB connector contacts being configured to carry said non-USB signals, said non-USB signals represent one of a set of PDI-EX signals, a set of SATA signals, a set of SAS signals, and a set of 1394 signals, a second connector-residing row of said two connector-residing rows of contacts represent USB connector contacts configured to carry said USB signals, said plurality of USB connector contacts being configured to be electrically coupled with said USB socket contacts when said extended USB plug is fully inserted into said extended USB socket.

20. The extended USB socket of claim 19 wherein said plurality of non-USB socket contacts in said second row are configured to make electrical contact with recessed pins of said first connector-residing row, said second row being disposed further away from an opening of said extended cavity than said first row, said plurality of non-USB socket contacts include at least one of 8 contacts and 6 contacts.

* * * * *